United States Patent
Ie et al.

(10) Patent No.: US 8,651,725 B2
(45) Date of Patent: Feb. 18, 2014

(54) BACKLIGHT MODULE

(75) Inventors: Jiun-Hau Ie, Taoyuan (TW);
Tung-Chuan Su, Taoyuan (TW);
Yu-Jeng Lin, Taoyuan (TW)

(73) Assignee: Global Lighting Technology Inc., Taoyuan (TW)

( * ) Notice: Subject to any disclaimer, the term of this patent is extended or adjusted under 35 U.S.C. 154(b) by 92 days.

(21) Appl. No.: 13/235,524

(22) Filed: Sep. 19, 2011

(65) Prior Publication Data

US 2012/0081920 A1  Apr. 5, 2012

(30) Foreign Application Priority Data

Sep. 30, 2010  (TW) ............................. 99133378 A
Apr. 15, 2011  (TW) ............................ 100113225 A
Apr. 19, 2011  (TW) ............................ 100113572 A

(51) Int. Cl.
*F21V 7/04* (2006.01)

(52) U.S. Cl.
USPC .......... 362/616; 362/607; 362/613; 362/612; 362/618; 362/623

(58) Field of Classification Search
USPC ......... 362/601, 606, 607, 608, 612–618, 621, 362/624, 627
See application file for complete search history.

(56) References Cited

U.S. PATENT DOCUMENTS

| | | | | |
|---|---|---|---|---|
| 2,646,637 A * | 7/1953 | Mungall et al. | ............... | 40/364 |
| 5,050,946 A * | 9/1991 | Hathaway et al. | ............... | 385/33 |
| 5,410,454 A * | 4/1995 | Murase et al. | ................ | 362/611 |
| 6,966,685 B2 * | 11/2005 | Li et al. | ......................... | 362/616 |
| 7,220,043 B2 * | 5/2007 | Cha et al. | ...................... | 362/621 |
| 7,287,892 B1 * | 10/2007 | Pang et al. | .................... | 362/604 |
| 7,367,704 B1 * | 5/2008 | Chang | ............................ | 362/621 |
| 7,753,579 B2 * | 7/2010 | Kim | ............................... | 362/620 |
| 8,167,474 B2 * | 5/2012 | Tanoue et al. | ................. | 362/607 |
| 2004/0062027 A1 * | 4/2004 | Kim et al. | ........................ | 362/31 |
| 2006/0044829 A1 * | 3/2006 | Yang et al. | ..................... | 362/613 |
| 2007/0139966 A1 * | 6/2007 | Kim et al. | ...................... | 362/616 |
| 2007/0147088 A1 * | 6/2007 | Chien et al. | .................... | 362/616 |
| 2007/0247873 A1 * | 10/2007 | Awai et al. | ..................... | 362/618 |
| 2008/0037282 A1 * | 2/2008 | Kurihara | ........................ | 362/618 |
| 2008/0158907 A1 * | 7/2008 | Lin et al. | ....................... | 362/606 |
| 2008/0259643 A1 * | 10/2008 | Ijzerman et al. | ............. | 362/619 |
| 2010/0253881 A1 * | 10/2010 | Han et al. | ....................... | 349/65 |
| 2011/0001901 A1 * | 1/2011 | Solomon et al. | ................ | 349/65 |

\* cited by examiner

*Primary Examiner* — Diane Lee
*Assistant Examiner* — Kenny C Sokolowski
(74) *Attorney, Agent, or Firm* — CKC & Partners Co., Ltd.

(57) ABSTRACT

A backlight module provided includes a light source, a first light-guided plate, and a second light-guided plate stacked on the first light-guided plate. The first light-guided plate includes a plate body and an extension disposed on an edge of the plate body and extending towards the second light-guided plate aside a lateral side of the second light-guided plate. The plate body and the extension form a seamless light incident surface. The extension has a reflection surface. The reflection surface connects the light incident surface or the surface of the plate body. The light source is disposed at a light incident surface of the first light-guided plate for projecting light into the light-guided plate.

8 Claims, 18 Drawing Sheets

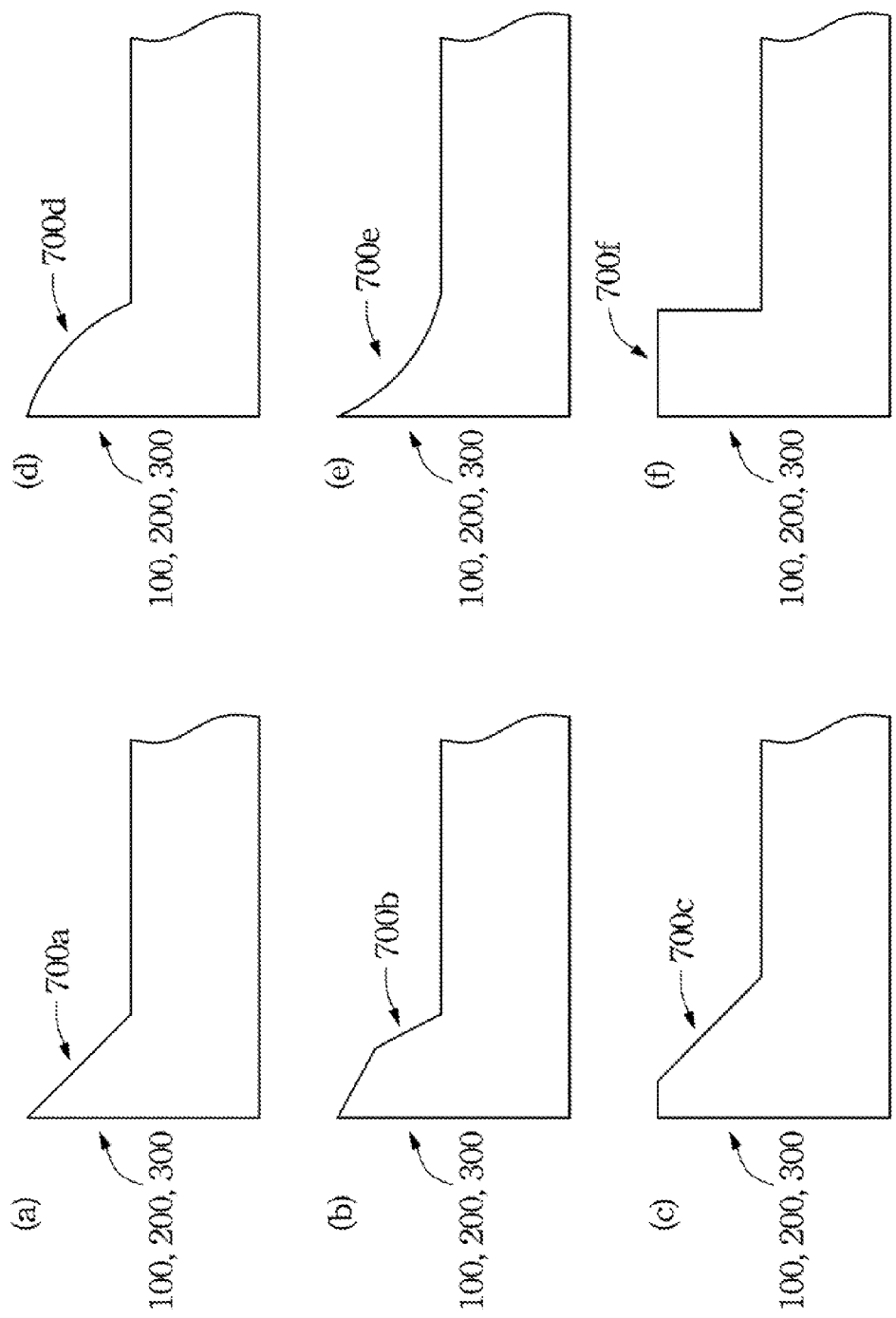

BACKLIGHT MODULE

RELATED APPLICATIONS

This application claims priority to Taiwanese Application Serial Number 099133378, filed Sep. 30, 2010, Taiwanese Application Serial Number 100113572, filed Apr. 19, 2011, and Taiwanese Application Serial Number 100113225, filed Apr. 15, 2011, which are herein incorporated by reference.

BACKGROUND

1. Technical Field

The present invention relates to a backlight module, more particular to a backlight module having an enlarged light incident surface thereof.

2. Description of Related Art

Regarding to the position of light sources, backlight modules can be categorized into a "side view" typed backlight module and a "top view" typed backlight module, in which the light source (e.g. LED) of the "side view type" backlight module is configured at a lateral side of a light guide plate thereof so that the light traveling direction of the light beams of the light source can be guided to provide a planar light source on the light guide plate by the light guide plate.

Because needs and limitations of the current trend, many light-emitting products are respectively developed into an appearance with compact and short properties so that the light guide plate of the backlight module of the light-emitting product is gradually thinned as well so as to reduce its thickness. Moreover, because the area of the light incident surface of the lateral side of the light guide plate is smaller than the efficient light outputting area of the light source (e.g. LED), the light incident surface of the light guide plate is unable to effectively receive all lights of the light source so as to deteriorate light output efficiency of the light guide plate.

Therefore, how to develop a backlight module capable of solving the mentioned disadvantages and inconveniences and maintaining the maximum light output efficiency of the light guide plate to avoid an excessive thickness of the light guide plate shall be a serious issue for the related industries to concern immediately.

SUMMARY

The present invention is to disclose a backlight module, which is capable of enlarging the area of light incident surfaces of two thinned and stacked light guide plates without thickening the thinned light guide plates completely, so that each light incident surface can effectively receive lights from a light emitting surface with a large area.

The present invention is to disclose a backlight module, which is capable of providing two opposite directions of light sources as bi-directional light sources of a dual sided display.

The present invention is to disclose a backlight module, which is capable of adopting light sources with different directions or/and different colors so as to evenly mix lights with expected color.

One practice of the present invention is to provide a backlight module. The backlight module comprises a first light source, and a first light guide plate and a second light guide plate stacked with each other. The first light guide plate comprises a first plate body and a first extending portion. The first plate body is provided with a first inner surface and a first outer surface which are opposite with each other. The first extending portion is disposed on an edge of the first inner surface, and is extended near a lateral side of the second light guide plate according to a direction from the first plate body towards the second light guide plate. Both the first extending portion and the first plate body are formed a first light incident surface thereof, and the first extending portion is further provided with a first reflective surface connected to one of the first light incident surface and the first inner surface at least.

The first light source is disposed at the first light incident surface of the first light guide plate, and is projecting light towards the first light incident surface so that the first reflective surface guides the light of the first light source to the first outer surface.

BRIEF DESCRIPTION OF THE DRAWINGS

The present invention will be apparent to those skilled in the art by reading the following detailed description of a preferred embodiment thereof, with reference to the attached drawings, in which:

FIG. 9(a)~FIG. 9(f) are side views respectively illustrating one of variations of the reflective surfaces in the backlight module of the present invention.

DESCRIPTION OF THE PREFERRED EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

The invention is to provide a backlight module. The backlight module includes two light guide plates and two light sources. The light guide plates are stacked with each other. The light sources respectively project lights to light incident surfaces of the light guide plates.

The area of each light incident surface of the light guide plate is greater than a cross sectional area of light guide plate in any section thereof, and the area of each light incident surface of the light guide plate is greater than or equal to a light emitting surface of the corresponding light source. Therefore, each of the light incident surfaces can effectively receive lights from the light emitting surface thereof with a large area.

Figure 1:
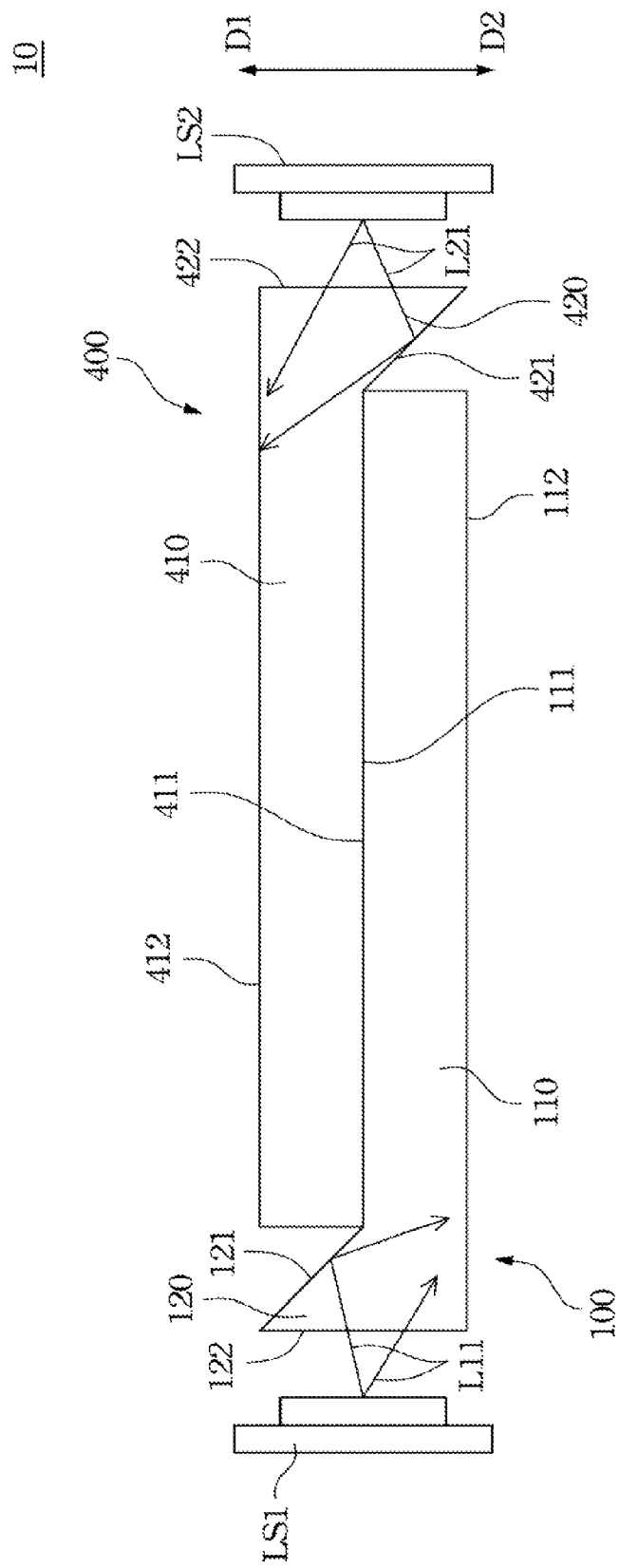
FIG. 1 is a side view illustrating a backlight module according to a first embodiment of the present invention.

Refer to FIG. 1 in which FIG. 1 is a side view illustrating a backlight module 10 according to a first embodiment of the present invention.

The first embodiment of the present invention provides a backlight module 10. The backlight module 10 includes a first light guide plate 100, a second light guide plate 400, a first light source LS1 and a second light source LS2. The first light guide plate 100 is substantially presented as an "L" shape, and includes a first plate body 110 and a first extending portion 120. The first plate body 110 is provided with a first inner surface 111 and a first outer surface 112 which are opposite with each other, and a number of lateral sides (shown in FIG. 1) surrounding the first inner surface 111 and the first outer surface 112 in which the area of each lateral side of the first light guide plate 100 is smaller than both the first inner surface 111 and the first outer surface 112, and each lateral side of the first light guide plate 100 is perpendicular to the first outer surface 112. The first extending portion 120 is disposed on an edge of the first inner surface 111, and extended outwards the first inner surface 111 of the first plate body 110. Both the first plate body 110 and the first extending portion 120 are cooperatively formed a seamless first light incident surface 122 thereof. The first extending portion 120 is further provided with a first reflective surface 121 connected to the first light incident surface 122 and the first inner surface 111. Comparing to the first inner surface 111, the first reflective surface 121 is an inclined surface for enhancing lights getting into the first plate body 110 and relieving the light leakage on the first light guide plate 100. Furthermore, the first reflective surface 121 is formed with non-glossy surface (or rough surface) thereon for reflecting lights back to the first plate body 110.

The second light guide plate 400 is substantially presented as an "L" shape, and includes a second plate body 410 and a second extending portion 420. The second plate body 410 is provided with a second inner surface 411 and a second outer surface 412 which are opposite with each other, and a number of lateral sides (shown in FIG. 1) surrounding the second inner surface 411 and the second outer surface 412 in which the area of each lateral side of the second light guide plate 400 is smaller than both the second inner surface 411 and the second outer surface 412, and each lateral side of the second light guide plate 400 is perpendicular to the second outer surface 412. The second extending portion 420 is disposed on an edge of the second inner surface 411, and extended outwards the second inner surface 411 of the second plate body 410. Both the second plate body 410 and the second extending portion 420 are cooperatively formed a seamless second light incident surface 422 thereof. The second extending portion 420 is further provided with a second reflective surface 421 connected to the second light incident surface 422 and the second inner surface 411. Comparing to the second inner surface 411, the second reflective surface 421 is an inclined surface for enhancing lights getting into the second plate body 410 and relieving the light leakage on the second light guide plate 400. Furthermore, the second reflective surface 421 is formed with non-glossy surface (or rough surface) thereon for reflecting lights back to the second plate body 410.

The first light guide plate 100 and the second light guide plate 400 are stacked with each other, so that the first inner surface 111 of the first plate body 110 couples to the second inner surface 411 of the second plate body 410 in which the first extending portion 120 and the second extending portion 420 are mutually departed away from each other, and are respectively extended towards two opposite directions. On the other word, the first extending portion 120 is disposed at one side of the second light guide plate 400, and the second extending portion 420 is disposed at one side of the first light guide plate 100.

In one embodiment, the first inner surface 111 of the first plate body 110 is securely coupled to the second inner surface 411 of the second plate body 410 by an adhesive layer (not shown in figures) therebetween.

Specifically, after the first light guide plate 100 is stacked on the second inner surface 411 of the second light guide plate 400 with the first inner surface 111 thereof.

The first extending portion 120 extends to be near one of the lateral sides of the second plate body 410 according to a direction D1 from the first plate body 110 towards the second plate body 410, in other words, the first extending portion 120 is extended to be near the lateral side of the second plate body 410 being far away from the second light incident surface 422 thereof, and the first reflective surface 121 of the first extending portion 120 is neighboring to the lateral side of the second plate body 410 being far away from the second light incident surface 422 thereof. Meanwhile, the first extending portion 120 is coplanar with the second plate body 410. Similarly, the second extending portion 420 extends to be near one of the lateral sides of the first plate body 110 according to a direction D2 from the second plate body 410 towards the first plate body 110, on the other word, the second extending portion 420 is extended to be near the lateral side of the first plate body 110 being far away from the first light incident surface 122 thereof, and the second reflective surface 421 of the second extending portion 420 is neighboring to the lateral side of the first plate body 110 being far away from the first light incident surface 122 thereof. Meanwhile, the second extending portion 420 is coplanar with the first plate body 110. Besides, the specified types of the first reflective surface 121 and the second reflective surface 421 will be described below as in FIG. 9.

The first light source LS1 is disposed at one side of the first light incident surface 122 of the first light guide plate 100 for projecting lights L11 towards the first light incident surface 122 so that the lights L11 enters the first light guide plate 120 via the first light incident surface 122. Furthermore, partial lights L11 of the first light source LS1 in the first light guide plate 100 can be reflected to the first outer surface 112 by the first reflective surface 121, and outputted from the first outer surface 112 so as to enhance light emitting illumination of the first light guide plate 100. The first light source LS1, for example, can be a LED light bar having LED elements arranged thereon in which each LED element emits lights having a light emitting area with a certain volume.

The second light source LS2 is disposed at one side of the second light incident surface 422 of the second light guide plate 400 for projecting lights L21 towards the second light incident surface 422 so that the lights L21 enters the second light guide plate 420 via the second light incident surface 422. Furthermore, partial lights L21 of the second light source LS2 in the second light guide plate 400 can be reflected to the second outer surface 412 by the second reflective surface 421, and outputted outwardly from the second outer surface 412 so as to enhance light emitting illumination of the second light guide plate 400. The second light source LS2, for example, can be a LED light bar having LED elements arranged thereon in which each LED element emits lights having a light emitting area with a certain volume.

Since the first light guide plate 100 and the second light guide plate 400 are stacked with each other, and the first light incident surface 122 and second light incident surface 422 are oriented oppositely with each other so that an emitting direction of the first light source LS1 and an emitting direction of the second light source LS2 are facing with each other.

Therefore, since an area of the first light incident surface 122 is larger than a total light emitting area of the first light source LS1, the first light incident surface 122 can effectively receive most of the total light emitting area of the first light source LS1. Similarly, since an area of the second light incident surface 422 is larger than a total light emitting area of the second light source LS2, the second light incident surface 422 can effectively receive most of the total light emitting area of the second light source LS2.

Also, although the area of the first light incident surface 122 is greater than a cross-sectional area of the first plate body 110 in any section thereof and the area of the second light incident surface 422 is greater than a cross-sectional area of the second plate body 410 in any section thereof, however, when the first light guide plate 100 and the second light guide plate 400 are stacked with each other, and the first extended portion 120 and the second extended portion 420 are extended reversely and respectively disposed at one side of the first light guide plate 100 and the second light guide plate 400, a total thickness of the first light guide plate 100 and the second light guide plate 400 stacked with each other will not be increased, thus, the backlight module still can be developed to follow a miniaturization trend.

Figure 2:
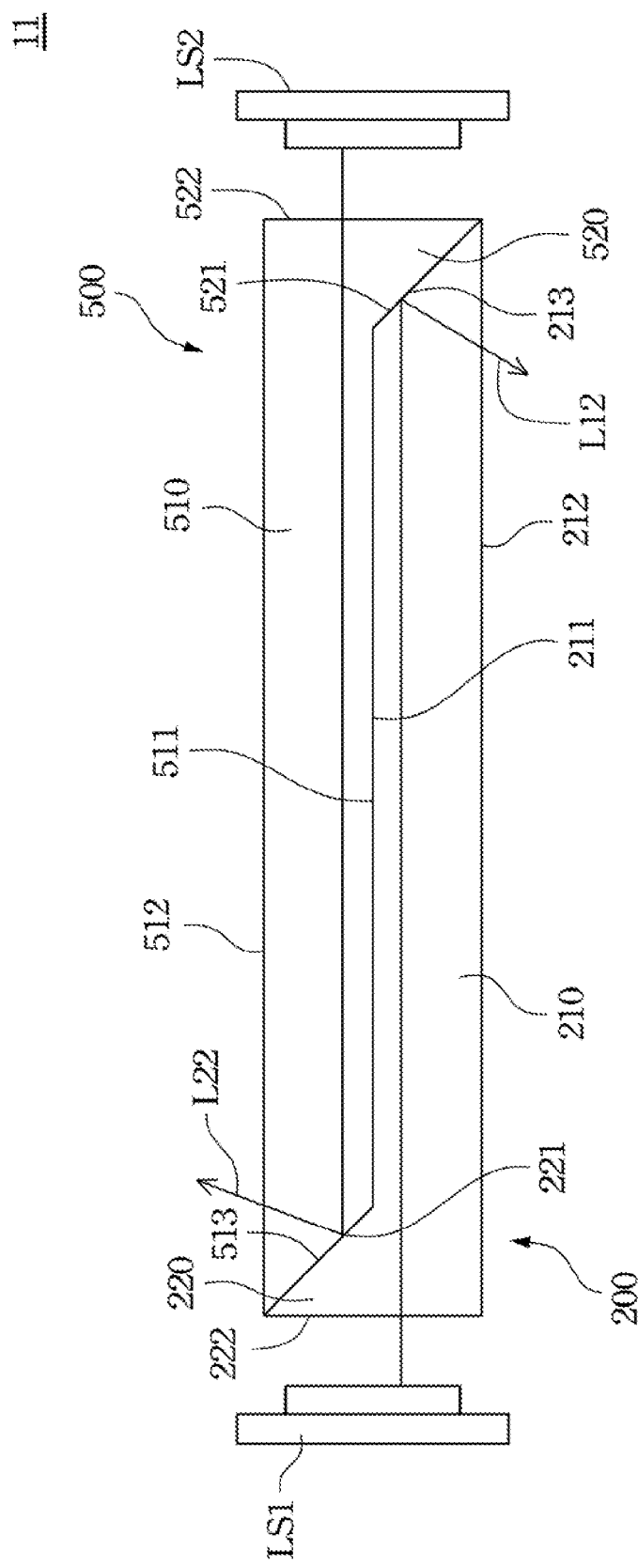
FIG. 2 is a side view illustrating a backlight module according to a second embodiment of the present invention.

Refer to FIG. 2 in which FIG. 2 is a side view illustrating a backlight module 11 according to a second embodiment of the present invention.

Based on the disclosure of the first embodiment in FIG. 1, besides the first plate body 210 and the first extended portion 220, the first light guide plate 200 of the backlight module 11 of the second embodiment further comprises a third reflective surface 213. The third reflective surface 213 is disposed on a lateral side of the first plate body 210 being far away from the first light incident surface 222, and neighboring to the second reflective surface 521, even contacting with the second reflective surface 521. Comparing to the first inner surface 211, the third reflective surface 213 is an inclined surface for relieving the light leakage on the first light guide plate 100. Furthermore, the third reflective surface 213 is formed with non-glossy surface (or rough surface) thereon for reflecting lights back in the first plate body 210.

Similarly, besides the second plate body 510 and the second extended portion 520, the second light guide plate 500 of the backlight module 11 of the second embodiment further comprises a fourth reflective surface 513. The fourth reflective surface 513 is disposed on a lateral side of the second plate body 510 being far away from the second light incident surface 522, and neighboring to the first reflective surface 221, even contacting with the first reflective surface 221. Comparing to the second inner surface 511, the fourth reflective surface 513 is an inclined surface for relieving the light leakage on the second light guide plate 500. Furthermore, the fourth reflective surface 513 is formed with non-glossy surface (or rough surface) thereon for reflecting lights back in the second plate body 510.

Therefore, after lights L12 of the first light source LS1 are guided by the first plate body 210 to the third reflective surface 213, the lights L12 of the first light source LS1 can be reflected to the first outer surface 212 by the third reflective surface 213, and outputted outwardly from the first outer surface 212, rather than leaked from the lateral side of the first plate body 210 being far away from the first outer surface 212 so as to waste the spared lights.

Similarly, after lights L22 of the second light source LS2 are guided by the second plate body 510 to the fourth reflective surface 513, the lights L22 of the second light source LS2 can be reflected to the second outer surface 512 by the fourth reflective surface 513, and outputted outwardly from the second outer surface 512, rather than leaked from the lateral side of the second plate body 510 being far away from the second outer surface 522 so as to waste the spared lights.

Besides, the profile of the third reflective surface 213 does not have to complementarily match the profile of the second reflective surface 521, and the profile of the fourth reflective surface 513 does not have to complementarily match the profile of the first reflective surface 221. Also, the specified types of the third reflective surface 213 and the fourth reflective surface 513 will be described below as in FIG. 9.

However, when the profile of the third reflective surface 213 is chosen to complementarily match the profile of the second reflective surface 521, and the profile of the fourth reflective surface 513 is chosen to complementarily match the profile of the first reflective surface 221 (FIG. 2), the third reflective surface 213 is fit to the second reflective surface 521, and the fourth reflective surface 513 is fit to the first reflective surface 221, so as to assist the first light guide plate 200 being securely combined with the second light guide plate 500.

The backlight modules 10, 11 of the invention in the first embodiment and second embodiment can be presented in a single directional light emitting design, that is, to place a reflective plate on an outer surface of the first light guide plate 100, 200 or an outer surface of the second light guide plate 400, 500; otherwise, the backlight modules 10, 11 of the invention in the first embodiment and second embodiment can be presented in a bi-directional light-emitting design, that is, to place a reflective plate between the first light guide plate 100, 200 or an outer surface of the second light guide plate 400, 500.

The following is to practice the single directional light emitting design and the bi-directional light-emitting design on an example of the backlight module 11 of the second embodiment, however, the single directional light emitting design and the bi-directional light-emitting design also can be practiced on the backlight module 10 of the first embodiment, not only limited in the second embodiment.

Figure 3A:
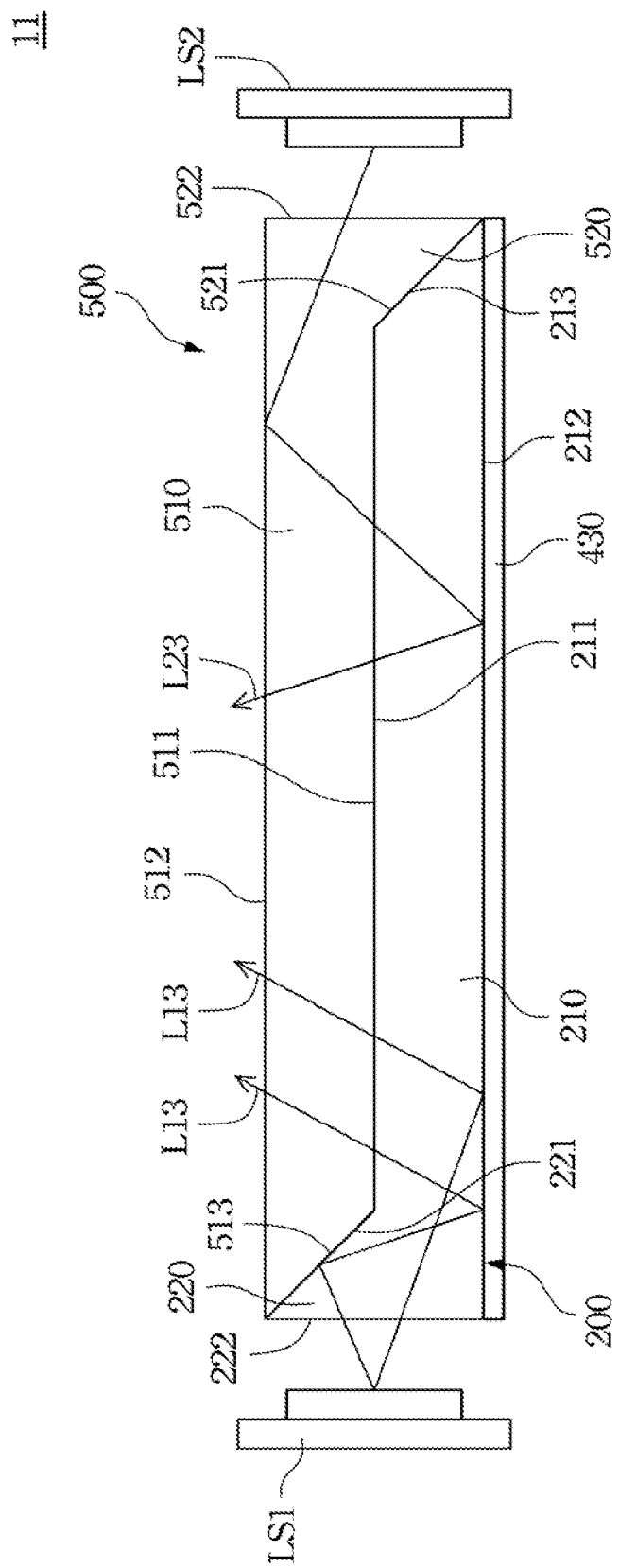
FIG. 3A is a side view illustrating the backlight module of the second embodiment of the present invention according to a single directional light emitting design.

Refer to FIG. 3A, in which FIG. 3A is a side view illustrating the backlight module 11 of the second embodiment of the present invention according to a single directional light emitting design.

According to one variation of the second embodiment, the backlight module 11 can be designed to emit lights along a single direction (D1). The backlight module 11 further comprises a first reflective plate 430 in which the first reflective plate 430 is disposed on the first outer surface 212 of the first plate body 210 (FIG. 3A), or the second outer surface 512 of the second plate body 510 (not shown).

Therefore, the lights L13 of the first light source LS1 can be reflected and guided to the second plate body 510 by the first reflective plate 430, in which after the lights L13 of the first light source LS1 is reflected and guided to the first reflective plate 430 by the first reflective surface 221, the lights L13 of the first light source LS1 then can be reflected and guided to the second plate body 510 by the first reflective plate 430.

In the same way, the lights L23 of the second light source LS2 also can be reflected and guided back to the second plate body 510 by the first reflective plate 430.

Figure 3B:
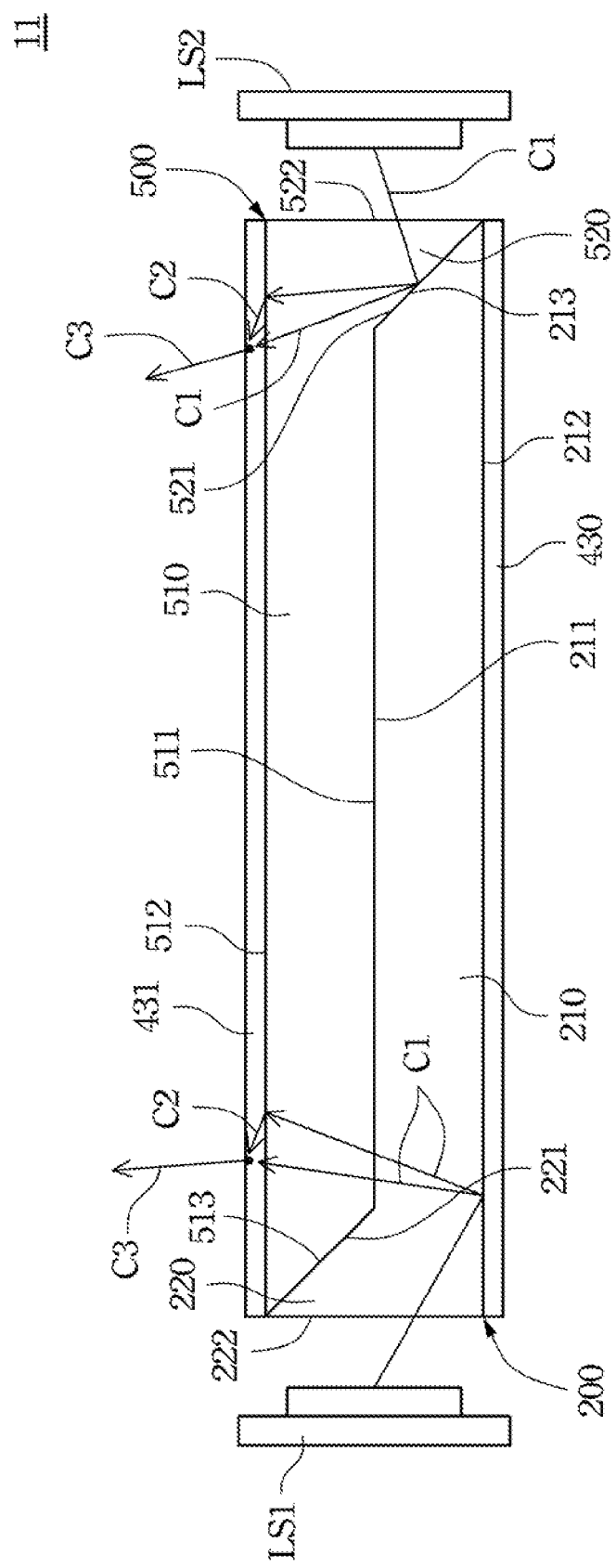
FIG. 3B is a side view illustrating one variation of FIG. 3A.

Refer to FIG. 3B in which FIG. 3B is a side view illustrating one variation of FIG. 3A.

Based on the disclosure of the backlight module 11 of the second embodiment in FIG. 3A, the second light guide plate 500 further comprises a second fluorescent layer 431 disposed on the second outer surface 512 of the second plate body 510.

The first light source LS1 and the second light source LS2 both emit a plurality of first color lights C1. Therefore, the first color lights C1 of the first light source LS1 and the second light source LS2 can be transmitted to the second fluorescent layer 431 via the second light guide plate 500. The second fluorescent layer 431 is excited to transfer the first color lights C1 into a plurality of second color lights C2, and the first color lights C1 and the second color lights C2 are mixed to become third color lights C3.

For an example, when the first color lights C1 emitted from the first light source LS1 and the second light source LS2 (adopting blue LED elements) are blue lights, and the second fluorescent layer 431 is a yellow fluorescent layer, thus, the second color lights C2 can be transferred to be yellow lights, and the third color lights C3 can be mixed into white lights.

For another example, when the first color lights C1 emitted from the first light source LS1 and the second light source LS2 (adopting blue LED elements) are blue lights, and the second fluorescent layer 431 is a fluorescent layer with red fluorescent powders and green fluorescent powders mixed therein, thus, the second color lights C2 can be transferred to be yellow lights, and the third color lights C3 can be mixed into white lights.

Figure 3C:
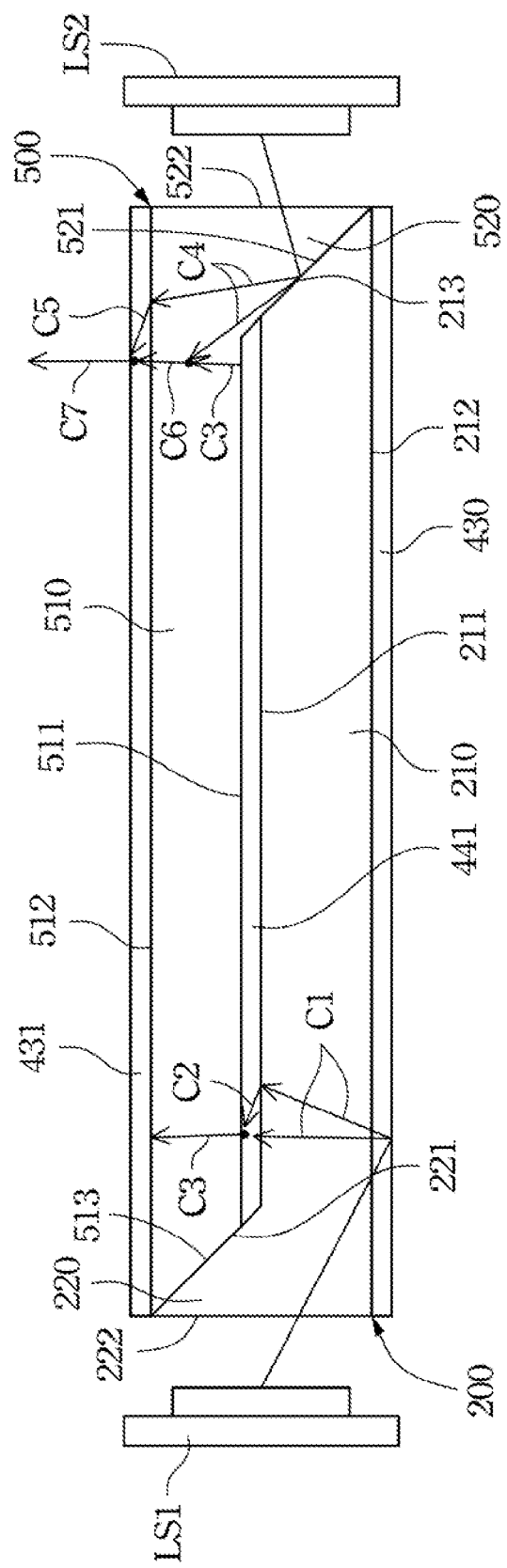
FIG. 3C is a side view illustrating another variation of FIG. 3B.

Refer to FIG. 3C in which FIG. 3C is a side view illustrating another variation of FIG. 3B.

Based on the disclosure of the backlight module 11 of the second embodiment in FIG. 3B, the first light guide plate 200 further comprises a first fluorescent layer 441. The first fluorescent layer 441 is disposed on the first inner surface 211 of the first plate body 210. The first light source LS1 emits first color lights C1, and the second light source LS2 emits fourth color lights C4 which are different to the first color lights C1. Therefore, the first fluorescent layer 441 is excited to transfer the first color lights C1 of the first light source LS1 into a plurality of second color lights C2. The first color lights C1 and the second color lights C2 are mixed to become third color lights C3. The second fluorescent layer 431 are excited to transfer the fourth color lights C4 of the second light source LS2 into a plurality of fifth color lights C5. The third color light C3 in the second plate body 510, and the fourth color lights C4 of the second light source LS2 are mixed to become sixth color light C6. The sixth color light C6 and the fifth color light C5 are mixed to become seventh color lights C7 in the second fluorescent layer 431. Therefore, lights emitted from the first light source LS1 and the second light source LS2 are finally become seventh color lights C7 and outputted outwards from the second fluorescent layer 431.

Comparing to traditional arts of fluorescent particles in a single light guide plate, lights with multiple colors mixed by the fluorescent particles of the single light guide plate could not effectively become lights with an expected color.

In the variation of the embodiment, the third color lights with an expected color can be provided from the first light guide plate to the second light guide plate so that the fifth color lights and the sixth color lights can be effectively mixed to become the seventh color lights with an expected color.

In the variations of the embodiment in FIG. 3B and FIG. 3C, the LED elements of the first light source LS1 and the second light source LS2 are free of fluorescent material therein, that is, the LED elements thereof only emit the original lights according to the characteristic of its LED chip therein.

Since the manufacturing process of the LED chips can be controlled steadily, primary colors generated mutually from the LED chips of the LED elements of the first light source LS1 and the second light source LS2 are substantially even.

Figure 4A:
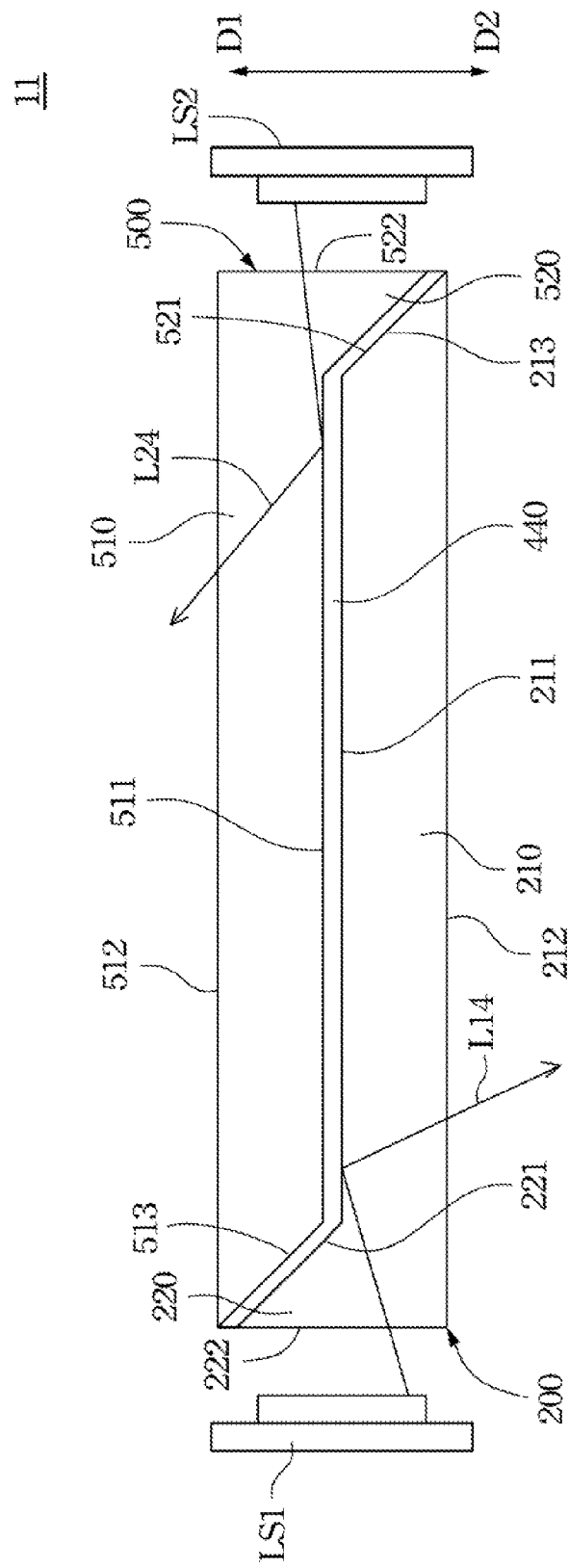
FIG. 4A is a side view illustrating the backlight module of the second embodiment of the present invention according to a dual directional light emitting design.

Refer to FIG. 4A in which FIG. 4A is a side view illustrating the backlight module 11 of the second embodiment of the present invention according to a dual directional light emitting design.

According to another variation of the second embodiment, the backlight module 11 can be designed to emit lights in dual directions (D1, D2). The backlight module 11 further comprises a second reflective plate 440. The second reflective plate 440 is disposed between the first plate body 210 and the second plate body 510. Therefore, lights L14 emitted from the first light source LS1 can be reflected and guided to the first outer surface 212; lights L24 of the second light source LS2 can be reflected and guided to the second outer surface 512, so as to provide light-emitting in dual directions.

Figure 4B:
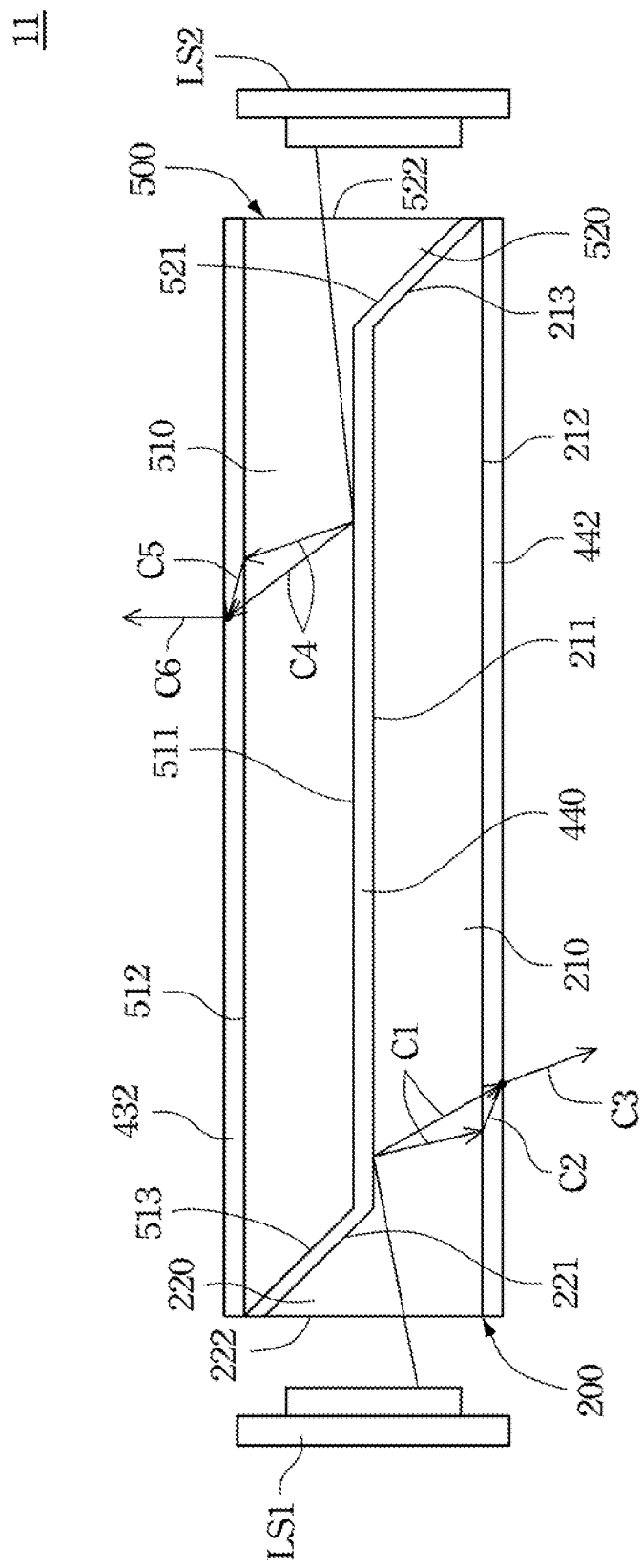
FIG. 4B is a side view illustrating one variation of FIG. 4A.

Refer to FIG. 4B in which FIG. 4B is a side view illustrating one variation of FIG. 4A.

The first outer surface 212 of the first plate body 210 of the first light guide plate 200 further comprises a first fluorescent layer 442. The second outer surface 512 of the second plate body 510 of the second light guide plate 500 further comprises a second fluorescent layer 432.

Therefore, when the first color lights C1 of the first light source LS1 travel to the first fluorescent layer 442 via the first light guide plate 200, the first fluorescent layer 442 is excited to transfer the first color lights C1 into a plurality of second color lights C2. The first color lights C1 and the second color lights C2 are mixed to become third color lights C3.

Similarly, when the fourth color lights C4 of the second light source LS2 travel to the second fluorescent layer 431 via the second light guide plate 500, the second fluorescent layer 432 is excited to transfer the fourth color lights C4 into a plurality of fifth color lights C5.

The fourth color lights C4 and the fifth color lights C5 are mixed to become sixth color lights C6. Furthermore, the first color lights C1 of the first light source LS1 and the second color lights C2 of the second light source LS2 are not limited to be the same in color.

In the variations of the embodiment in FIG. 4B, the LED elements of the first light source LS1 and the second light source LS2 are free of fluorescent material therein, that is, the LED elements thereof only emit the original lights according to the characteristic of its LED chip therein.

Since the manufacturing process of the LED chips can be controlled steadily, primary colors generated mutually from the LED chips of the LED elements of the first light source LS1 and the second light source LS2 are substantially even.

According to the other variations of the mentioned first embodiment and second embodiment, at least one of the first inner surface 111, 211, the second inner surface 411, 511, the first outer surface 112, 212 and the second inner surface 412, 512 can be optionally provided with a microstructure pattern (not shown) thereon. The microstructure pattern is provided with a plurality of optical microstructures, and the optical microstructures can be arranged on at least one of the first inner surface 111, 211, the second inner surface 411, 511, the first outer surface 112, 212 and the second inner surface 412, 512 according to a suitable arrangement (e.g. density and position).

For example, the distributing density of the optical microstructures will be increased as the position of the optical microstructures is far away from the light source. However, the distributing density and arrangement style of the optical microstructures are not particularly limited in the invention, can be decided according to the actual design need; or a regular arrangement or random arrangement.

For another example, in the case of the single directional light emitting design, the first inner surface 111, 211 or the first outer surface 112, 212 can be provided with a suitable microstructure pattern thereon, thus, the first light guide plate 100, 200 can output higher effectiveness of lights to the second light guide plate 400, 500. At the same time, the second inner surface 411, 511 or the second outer surface 412, 512 can be provided with a suitable microstructure pattern thereon, thus, the second outer surface 412, 512 of the second light guide plate 400, 500 can output more even lights (e.g. rough effect) to the second light guide plate 400, 500.

Regarding the arrangement of the microstructure pattern, the optical microstructures can be concavely or convexly made at least one of the first inner surface 111, 211, the second inner surface 411, 511, the first outer surface 112, 212 and the second inner surface 412, 512.

Regarding the cross-sectional shape of the optical microstructures, the cross-sectional shape of the optical microstructures, for example, can be round, square, rectangular, diamond, fine round, triangular, or wavy etc.

Furthermore, in the first embodiment or the second embodiment, both the first light guide plate 100, 200 and the second light guide plate 400, 500 of the mentioned backlight module 10, 11 can be provided with a combination of the fluorescent layer and the microstructure pattern.

Figure 5A:
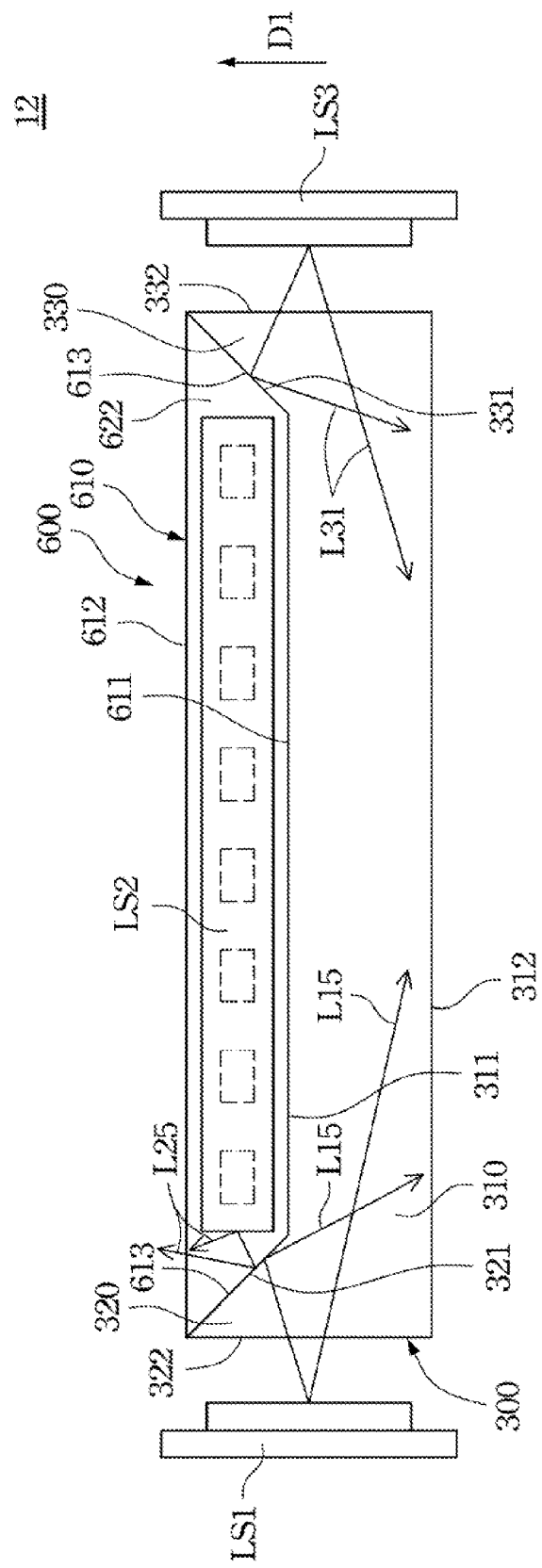
FIG. 5A is a side view illustrating a backlight module according to a third embodiment of the present invention.
Figure 5B:
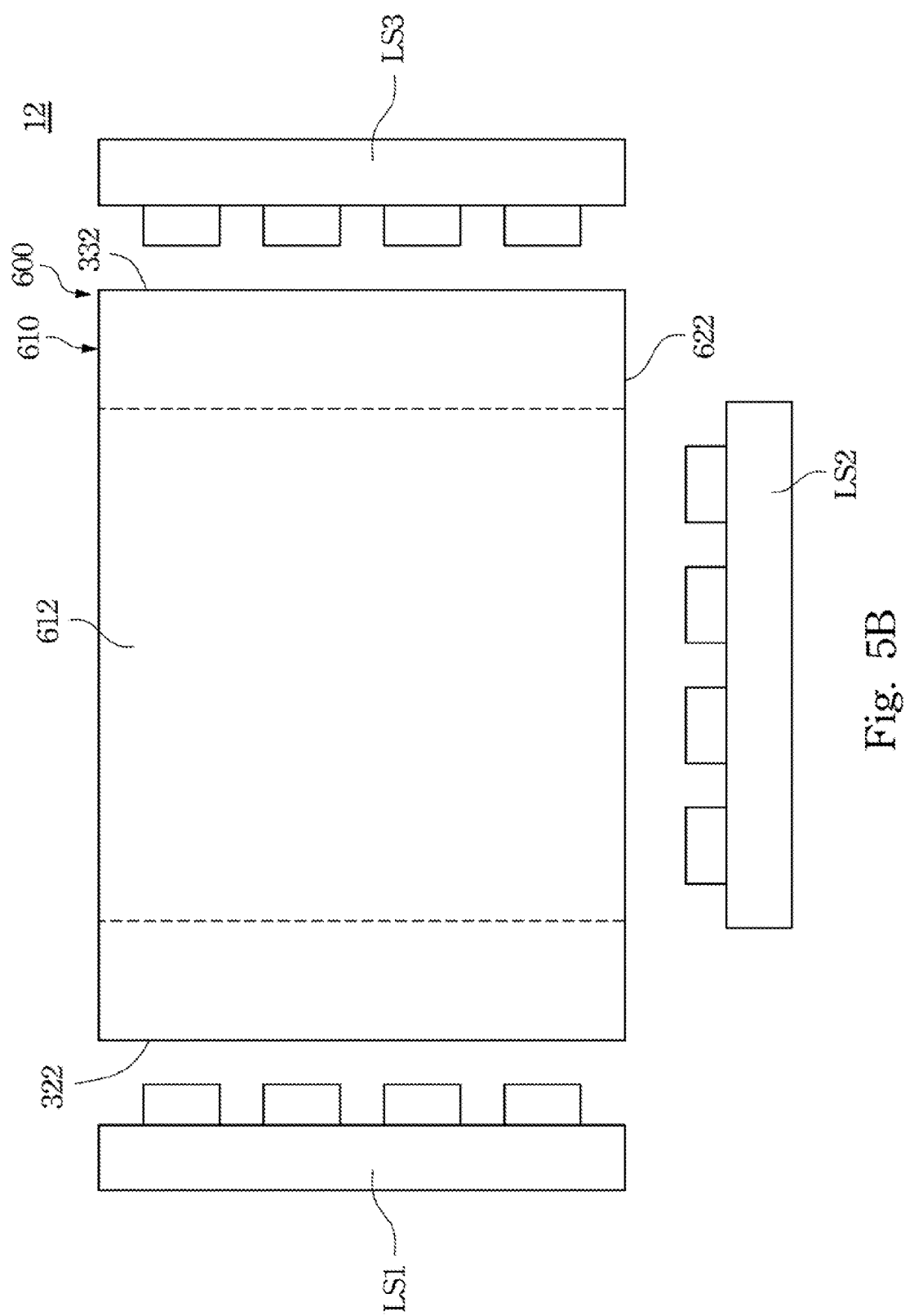
FIG. 5B is a top view illustrating the backlight module of the third embodiment of the present invention.

Refer to FIG. 5A and FIG. 5B in which FIG. 5A is a side view illustrating a backlight module 12 according to a third embodiment of the present invention, and FIG. 5B is a top view illustrating the backlight module 12 of the third embodiment of the present invention.

The backlight module 12 of the third embodiment of the present invention comprises a first light guide plate 300 and a second light guide plate 600, a first light source LS1, a second light source LS2 and a third light source LS3. The first light guide plate 300 is substantially presented as a "U" shape, comprises a first plate body 310, a first extending portion 320, and a third extending portion 330.

The first plate body 310 is provided with a first inner surface 311 and a first outer surface 312 which are opposite with each other, and a number of lateral sides (shown in FIG. 5A) surrounding the first inner surface 311 and the first outer surface 312 in which the area of each lateral side of the first light guide plate 300 is smaller than both the first inner surface 311 and the first outer surface 312, and each lateral side of the first light guide plate 300 is perpendicular to the first outer surface 312.

The first extending portion 320 is disposed on an edge of the first inner surface 311, and extended outwards the first inner surface 311 of the first plate body 310. Both the first plate body 310 and the first extending portion 320 are cooperatively formed a seamless first light incident surface 322 thereof. The first extending portion 320 is further provided with a first reflective surface 321 connected to the first light incident surface 322 and the first inner surface 311. The third extending portion 330 is disposed on the other edge of the first inner surface 311 being far away from the first extending portion 320, and extended outwards the first inner surface 311 of the first plate body 310. Both the first plate body 310 and the third extending portion 330 are cooperatively formed a seamless third light incident surface 332 thereof. The third extending portion 330 is further provided with a fifth reflective surface 331 connected to the third light incident surface 332 and the first inner surface 311.

The second light guide plate 600 further comprises a trapezoidal plate body 610. The trapezoidal plate body 610 comprises a third inner surface 611, a third outer surface 612, two sixth reflective surfaces 613, and two second light incident surfaces 622. The third inner surface 611 and the third outer surface 612 are oppositely disposed in parallel on the trapezoidal plate body 610, and an area of the third outer surface 612 is greater than an area of the third inner surface 611. The sixth reflective surfaces 613 are oppositely disposed on the trapezoidal plate body 610, have the same area, and one of the sixth reflective surfaces 613 connects the second light incident surfaces 622, the third inner surface 611 and the third outer surface 612.

The first light guide plate 300 and the second light guide plate 600 are stacked with each other, and the second light guide plate 600 is disposed on the first inner surface 311 of the first light guide plate 300, and between the first extending portion 320 and the third extending portion 330. For example, the first inner surface 311 of the first plate body 310 can be fixedly coupled on the third inner surface 611 of the trapezoidal plate body 610 by an adhesive layer (not shown in figures) therebetween.

Specifically, after the first light guide plate 300 and the second light guide plate 600 are stacked with each other, the trapezoidal plate body 610 is coupled on the first inner surface 311 of the first plate body 310 with the third inner surface 611 of the trapezoidal plate body 610, and disposed between the first extending portion 320 and the third extending portion 330.

The first extending portion 320 of the first light guide plate 300 is extended towards a direction D1 from the first plate body 310 to the trapezoidal plate body 610, so that the first extending portion 320 is arranged next to one of the sixth reflective surfaces 613 of the second light guide plate 600 in which the first reflective surface 321 of the first extending portion 320 is neighbored and facing to one of the sixth reflective surfaces 613 of the second light guide plate 600, which means, the first extending portion 320 and the trapezoidal plate body 610 are coplanar.

Also, the third extending portion 330 of the first light guide plate 300 is extended towards a direction D1 from the first plate body 310 to the trapezoidal plate body 610, so that the third extending portion 330 is arranged next to the other of the sixth reflective surfaces 613 of the second light guide plate 600 in which the fifth reflective surface 331 of the third extending portion 330 is neighbored and facing to the other sixth reflective surface 613 of the second light guide plate 600, which means, the third extending portion 330 and the trapezoidal plate body 610 are coplanar.

Moreover, the profile of the first reflective surface 321 does not have to complementarily match the profile of the sixth reflective surface 613, and the profile of the fifth reflective surface 331 does not have to complementarily match the profile of the sixth reflective surface 613. Also, the specified types of the first reflective surface 321, the fifth reflective surface 331 and the sixth reflective surfaces 613 will be described below as in FIG. 9.

However, when the profile of the first reflective surface 321 and the fifth reflective surface 331 are chosen to complementarily match the profile of the sixth reflective surface 613, respectively, the first reflective surface 321 is fit to and contacted one of the sixth reflective surfaces 613, and the fifth reflective surface 331 is fit to and contacted the other sixth reflective surface 613, so as to assist the second light guide plate 600 being securely combined with the first light guide plate 300.

The first light source LS1 is disposed on one side of the first light incident surface 322 so as to project lights L15 to the first light incident surface 322, and the lights L15 of the first light source LS1 get into the first plate body 310 via the first light incident surface 322.

Furthermore, partial lights L15 of the first light source LS1 in the first light guide plate 300 can be reflected to the first outer surface 312 by the first reflective surface 321, and outputted from the first outer surface 312 so as to enhance light emitting illumination of the first light guide plate 300. The first light source LS1, for example, can be a LED light bar having LED elements arranged thereon in which each LED element emits lights having a light emitting area with a certain volume.

The third light source LS3 is disposed on the other side of the third light incident surface 332 opposite to the first light source LS1 so as to project lights L31 to the third light incident surface 332, and the lights L31 of the third light source LS3 get into the first plate body 310 via the first light incident surface 332.

Furthermore, partial lights L31 of the third light source LS3 in the first light guide plate 300 can be reflected to the first outer surface 312 by the fifth reflective surface 331, and outputted from the first outer surface 312 so as to enhance light emitting illumination of the first light guide plate 300. The third light source LS3, for example, can be a LED light bar having LED elements arranged thereon in which each LED element emits lights having a light emitting area with a certain volume.

Since the first light incident surface 322 and the third light incident surface 332 are facing reversely with each other, so that an emitting direction of the first light source LS1 and an emitting direction of the third light source LS3 are facing with each other, and the first extending portion 320 and the trapezoidal plate body 610 are coplanar.

The second light source LS2 is at least disposed at one of the second light incident surface 622 of the trapezoidal plate body 610 so as to project lights L25 to the second light incident surface 622, and the lights L25 of the second light source LS2 get into the trapezoidal plate body 610 via the second light incident surface 622, and the lights L25 of the second light source LS2 in the trapezoidal plate body 610 are guided and outputted outwards the third outer surface 612.

Furthermore, the partial lights L25 of the second light source LS2 in the trapezoidal plate body 610 can be reflected and guided towards the third outer surface 612 by the sixth reflective surface 613, and outputted outwards the third outer surface 612, so as to enhance light emitting illumination of the third outer surface 612 of the trapezoidal plate body 610. The second light source LS2, for example, can be a LED light bar having LED elements arranged thereon in which each LED element emits lights having a light emitting area with a certain volume.

When the first light guide plate 300 and the second light guide plate 600 are stacked with each other, and the first light incident surface 322 (or the third light incident surface 332) and second light incident surface 622 are facing reversely with each other so that an emitting direction of the first light source LS1 (or third light source LS3) and an emitting direction of the second light source LS2 are facing with each other, and the first light source LS1 (or third light source LS3) and the second light source LS2 are coplanar.

Therefore, since an area of the first light incident surface 322 is larger than a total light emitting area of the first light source LS1, the first light incident surface 322 can effectively receive most of the total light emitting area of the first light source LS1. Similarly, since an area of the third light incident surface 332 is larger than a total light emitting area of the third light source LS3, the third light incident surface 332 can effectively receive most of the total light emitting area of the third light source LS3.

Although the area of the first light incident surface 322 and the third light incident surface 332 are respectively greater than a cross-sectional area of the first plate body 310 in any section thereof, however, after the first light guide plate 300 and the second light guide plate 600 are stacked with each other, the second light guide plate 600 is arranged on the first inner surface 311 between the first extending portion 320 and the third extending portion 330, and the first reflective surface 321 and the third reflective surface 331 of the first light guide plate 300 are respectively fit to and contact the two sixth reflective surfaces of the second light guide plate 600.

A total thickness of the first light guide plate 300 and the second light guide plate 600 stacked with each other will not be increased, thus, the backlight module still can be developed to follow a miniaturization trend.

Figure 6A:
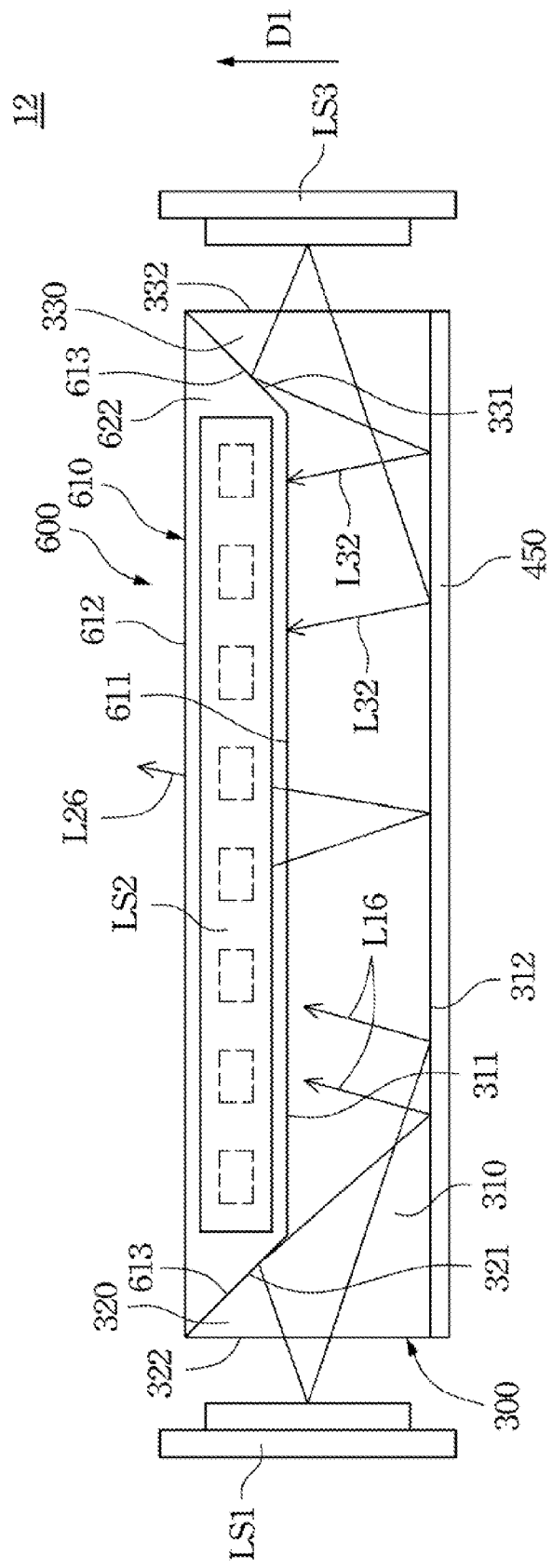
FIG. 6A is a side view illustrating the backlight module of the third embodiment of the present invention according to a single directional light emitting design.

Refer to FIG. 6A in which FIG. 6A is a side view illustrating the backlight module 12 of the third embodiment of the present invention according to a single directional light emitting design.

According to one variation of the third embodiment, the backlight module 12 can be designed to emit lights along a single direction (D1). The backlight module 12 further comprises a third reflective plate 450 in which the third reflective plate 450 is disposed on the first outer surface 312 of the first plate body 310 (FIG. 6A).

Therefore, the lights L16 of the first light source LS1 and the lights L32 of the first light source LS3 can be reflected and guided to the first plate body 310 by the third reflective plate 450, in which after the lights L16 of the first light source LS1 is reflected and guided to the third reflective plate 450 by the first reflective surface 321, the lights L16 of the first light source LS1 then can be reflected and guided to the trapezoidal plate body 610 by the third reflective plate 450. Also, the lights L32 of the third light source LS3 can be reflected and guided to the third reflective plate 450 by the fifth reflective plate 331, and then the lights L32 of the third light source LS3 can be reflected and guided to the trapezoidal plate body 610 by the third reflective plate 450. In the same way, the partial lights L26 of the second light source LS2 can be reflected and guided back to the trapezoidal plate body 610 by the third reflective plate 450, and outputted outwardly from the third outer surface 612.

Figure 6B:
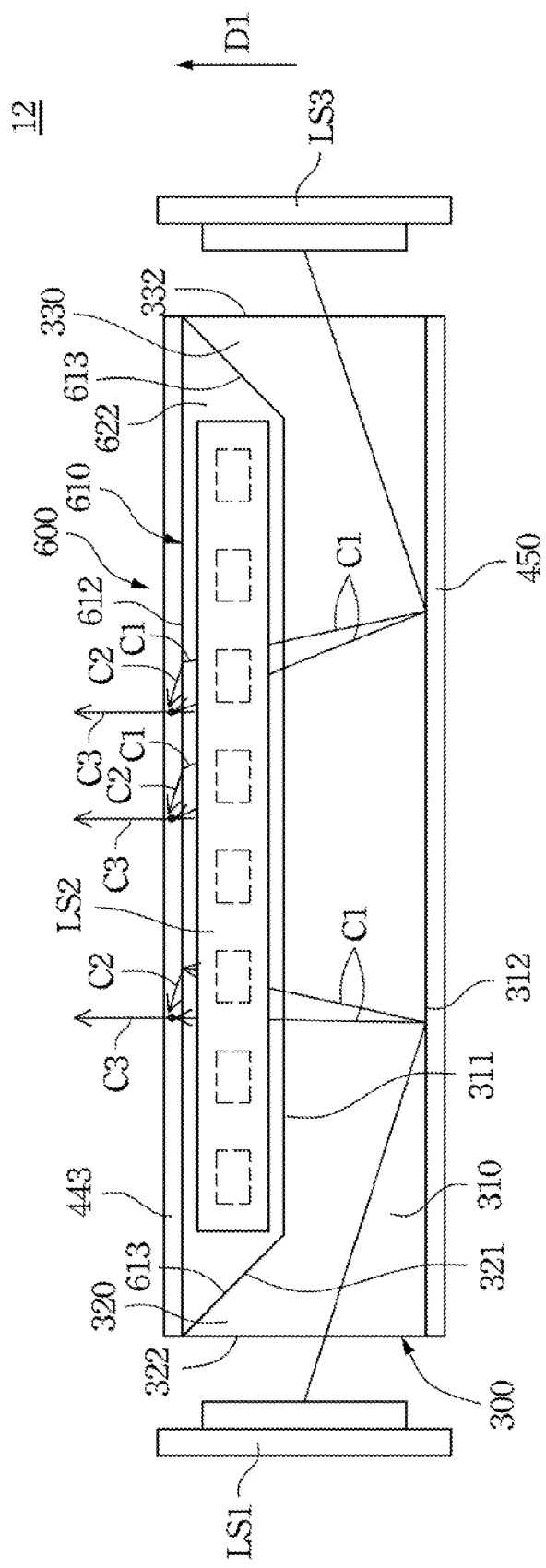
FIG. 6B is a side view illustrating one variation of FIG. 6A.

Refer to FIG. 6B in which FIG. 6B is a side view illustrating one variation of FIG. 6A.

Based on the disclosure of the backlight module 12 of the second embodiment in FIG. 3B, the second light guide plate 600 further comprises a fourth fluorescent layer 443 disposed on the third outer surface 612 of the trapezoidal plate body 610.

The first light source LS1, the second light source LS2 and the third light source LS3 all emit a plurality of first color lights C1. Therefore, the first color lights C1 from the first light source LS1, the second light source LS2 and the third light source LS3 can be transmitted to the fourth fluorescent layer 443 of the trapezoidal plate body 610. The fourth fluorescent layer 443 is excited to transfer the first color lights C1 into a plurality of second color lights C2, and the first color lights C1 and the second color lights C2 are mixed to become third color lights C3.

For an example, when the first color lights C1 emitted from the first light source LS1, the second light source LS2 and the third light source LS3 (adopting blue LED elements) are blue lights, and the fourth fluorescent layer 443 is a yellow fluorescent layer, thus, the second color lights C2 can be transferred to be yellow lights in the fourth fluorescent layer 443, and the third color lights C3 can be mixed into white lights.

For another example, the first color lights C1 emitted from the first light source LS1, the second light source LS2 and the third light source LS3 (adopting blue LED elements) are blue lights, and the fourth fluorescent layer 443 is a fluorescent layer with red fluorescent powders and green fluorescent powders mixed therein, thus, the second color lights C2 can be transferred to be yellow lights, and the third color lights C3 can be mixed into white lights.

Figure 6C:
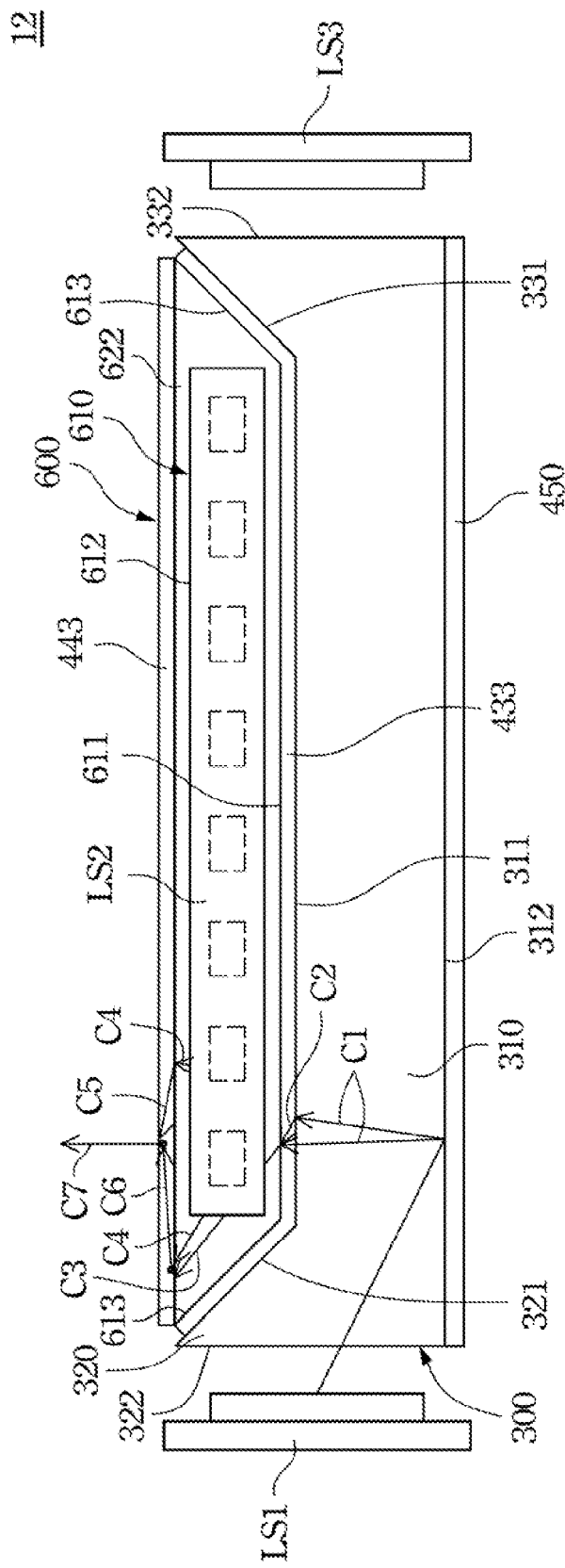
FIG. 6C is a side view illustrating another variation of FIG. 6B.

Refer to FIG. 6C in which FIG. 6C is a side view illustrating another variation of FIG. 6B.

Based on the disclosure of the backlight module 12 of the third embodiment in FIG. 6B, the first light guide plate 300 further comprises a third fluorescent layer 433. The third fluorescent layer 433 is seamlessly disposed on the first reflective surface 321, the first inner surface 311 and the fifth reflective surface 331 of the first plate body 310.

The first light source LS1 emits first color lights C1, and the second light source LS2 emits fourth color lights C4 which are different to the first color lights C1. Therefore, third fluorescent layer 433 is excited to transfer the first color lights C1 of the first light source LS1 into a plurality of second color lights C2. The first color lights C1 and the second color lights C2 are mixed to become third color lights C3. The fourth fluorescent layer 443 is excited to transfer the fourth color lights C4 of the second light source LS2 into a plurality of fifth color lights C5.

The third color lights C3 and the fourth color lights C4 in the trapezoidal plate body 610 are mixed to become sixth color lights C6. The sixth color lights C6 and the fifth color lights C5 are mixed to become seventh color lights C7 in the fourth fluorescent layer 443. Therefore, lights emitted from the first light source LS1 and the second light source LS2 are finally become seventh color lights C7, and the seventh color lights C7 is outputted outwards from the second fluorescent layer 431.

Comparing to traditional arts of fluorescent particles in a single light guide plate, lights with multiple colors mixed by the fluorescent particles of the single light guide plate could not effectively become lights with an expected color.

In the variation of the third embodiment, the third color lights with an expected color can be provided from the first light guide plate to the second light guide plate so that the fifth color lights and the sixth color lights can be effectively mixed to become the seventh color lights with an expected color.

In the variations of the embodiment in FIG. 6B and FIG. 6C, the LED elements of the first light source LS1 and the second light source LS2 are free of fluorescent material therein, that is, the LED elements thereof only emit the original lights according to the characteristic of its LED chip therein.

Since the manufacturing process of the LED chips can be controlled steadily, primary colors generated mutually from the LED chips of the LED elements of the first light source LS1 and the second light source LS2 are substantially even.

Figure 7A:
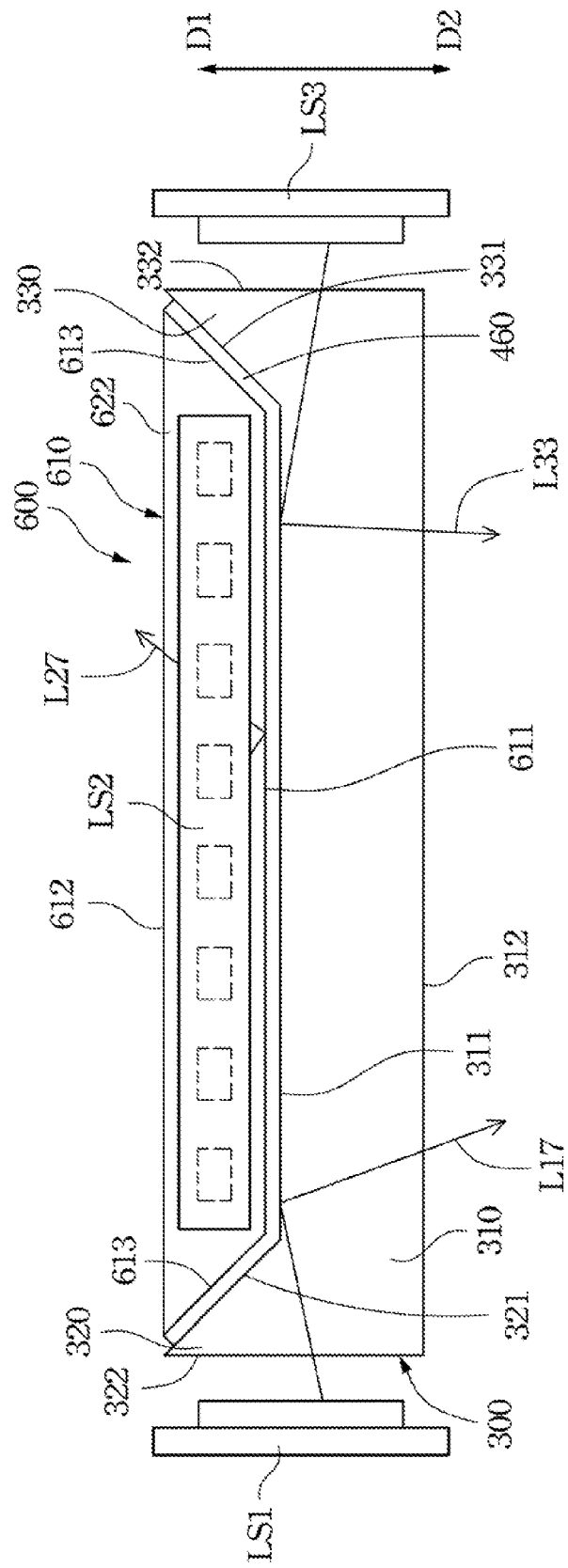
FIG. 7A is a side view illustrating the backlight module of the third embodiment of the present invention according to a dual directional light emitting design.

Refer to FIG. 7A in which FIG. 7A is a side view illustrating the backlight module 12 of the third embodiment of the present invention according to a dual directional light emitting design.

According to further another variation of the third embodiment, the backlight module 12 can be designed to emit lights in dual directions (D1, D2). The backlight module 12 further comprises a fourth reflective plate 460. The fourth reflective plate 460 is disposed between the first plate body 310 and the trapezoidal plate body 610. In one option, the fourth reflective plate 460 can be only arranged between the first inner surface 311 of the first plate body 310 and the third inner surface 611 of the trapezoidal plate body 610. In a preferred option, the fourth reflective plate 460 is folded in several times or the fourth reflective plate 460 is flexible, thus, the fourth reflective plate 460 can be placed on the first reflective surface 321, the first inner surface 311 and the fifth reflective surface 331 of the first plate body 310, so as to arranged between the first plate body 310 and the trapezoidal plate body 610.

Therefore, both lights L17 emitted from the first light source LS1 and lights L33 emitted from the third light source LS3 can be reflected and guided to the first outer surface 312 by the fourth reflective plate 460; lights L27 of the second light source LS2 can be reflected and guided to the third outer surface 612 by the fourth reflective plate 460, so as to provide light emitting in dual directions (D1, D2).

Figure 7B:
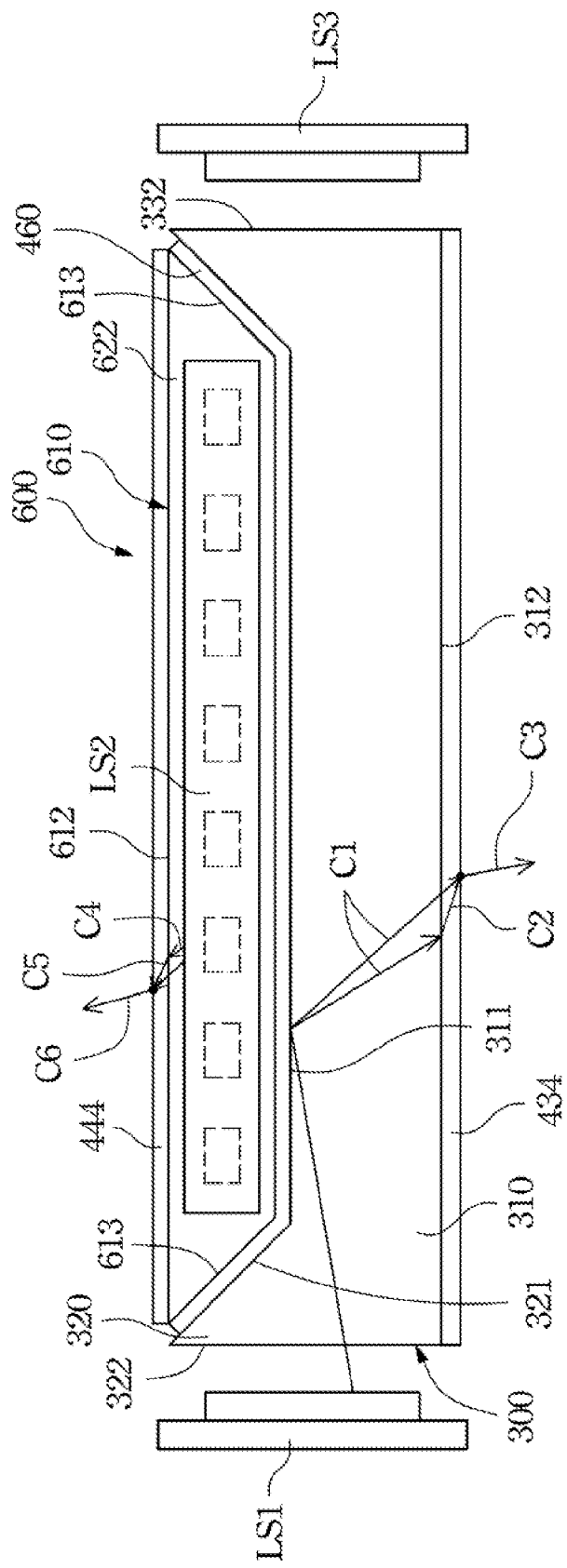
FIG. 7B is a side view illustrating one variation of FIG. 7A.

Refer to FIG. 7B in which FIG. 7B is a side view illustrating one variation of FIG. 7A.

The first outer surface 312 of the first plate body 310 of the first light guide plate 300 further comprises a third fluorescent layer 434. The third outer surface 612 of the trapezoidal plate body 610 of the second light guide plate 600 further comprises a fourth fluorescent layer 444.

Therefore, when the first color lights C1 of the first light source LS1 and the third light source LS3 travel to the third fluorescent layer 434 via the first light guide plate 300, and the third fluorescent layer 434 is excited to transfer the first color lights C1 into a plurality of second color lights C2. The first color lights C1 and the second color lights C2 are mixed to become third color lights C3.

Similarly, when the fourth color lights C4 of the second light source LS2 travel to the fourth fluorescent layer 444 via the second light guide plate 600, the fourth fluorescent layer 444 is excited to transfer the fourth color lights C4 into a plurality of fifth color lights C5. The fourth color lights C4 and the fifth color lights C5 are mixed to become sixth color lights C3. Moreover, the first light source LS1 emits first color lights C1, and the second light source LS2 emits fourth color lights C4 which are different to the first color lights C1.

In the variations of the embodiment in FIG. 7B, the LED elements of the first light source LS1 and the second light source LS2 are free of fluorescent material therein, that is, the LED elements thereof only emit the original lights according to the characteristic of its LED chip therein.

Since the manufacturing process of the LED chips can be controlled steadily, primary colors generated mutually from the LED chips of the LED elements of the first light source LS1 and the second light source LS2 are substantially even.

According to the other variations of the mentioned third embodiment, at least one of the first inner surface 311, the third inner surface 611, the first outer surface 312 and the third outer surface 612 can be optionally provided with a microstructure pattern (not shown) thereon. The microstructure pattern is provided with a plurality of optical microstructures, and the optical microstructures can be arranged on at least one of the first inner surface 311, the third inner surface 611, the first outer surface 312 and the third outer surface 612 according to a suitable arrangement (e.g. density and position).

For example, the distributing density of the optical microstructures will be increased as the position of the optical microstructures is far away from the light source. However, the distributing density and arrangement style of the optical microstructures are not particularly limited in the invention, can be decided according to the actual design need; or a regular arrangement or random arrangement.

For another example, in the case of the single directional light emitting design, the first outer surface 312 or the first inner surface 311 can be provided with a suitable microstructure pattern thereon, thus, the first light guide plate 300 can output higher effectiveness of lights to the second light guide plate 600. At the same time, the third outer surface 612 or the third inner surface 611 can be provided with a suitable microstructure pattern thereon, thus, the third outer surface 612 of the second light guide plate 600 can output more even lights (e.g. rough effect).

Regarding the arrangement of the microstructure pattern, the optical microstructures can be concavely or convexly made on at least one of the first inner surface 311, the third inner surface 611, the first outer surface 312 and the third outer surface 612.

Regarding the cross-sectional shape of the optical microstructures, the cross-sectional shape of the optical microstructures, for example, can be round, square, rectangular, diamond, fine round, triangular, or wavy etc.

Furthermore, in the third embodiment, both the first light guide plate 300, and the second light guide plate 600 of the mentioned backlight module 12 can be provided with a combination of the fluorescent layer and the microstructure pattern.

Figure 8A:
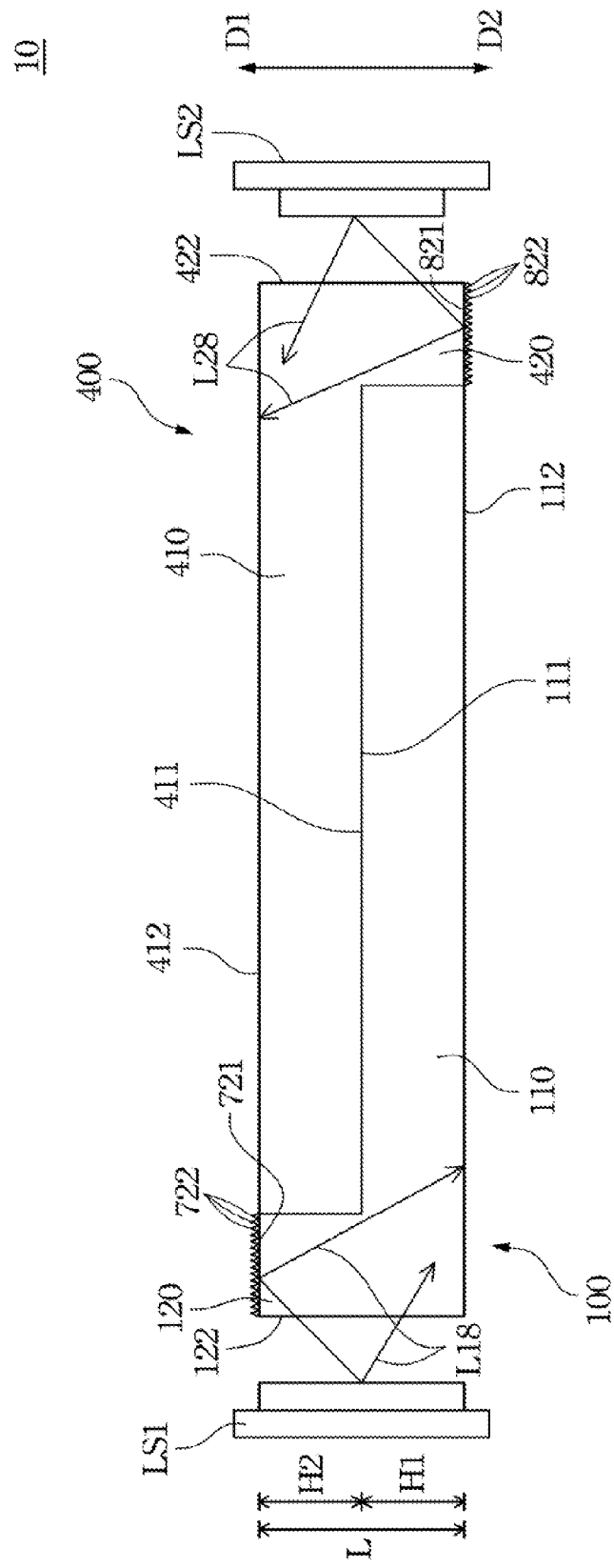
FIG. 8A is a side view illustrating a backlight module according to a fourth embodiment of the present invention.

Refer to FIG. 8A in which FIG. 8A is a side view illustrating a backlight module 10 according to a fourth embodiment of the present invention.

Based on the disclosure of the backlight module 10 of the first embodiment in FIG. 1, and the second embodiment in FIG. 2, the first extending portion 120 and the second extending portion 420 are respectively presented as a rectangle, thus, when the first light guide plate 100 and the second light guide plate 420 are stacked with each other, the first light guide plate 100 and the second light guide plate 420 can be complementarily stacked with each other.

The first reflective surface 721 of the first extending portion 120 is disposed on a surface of the first extending portion 120 being far away from the first plate body 110, and the first reflective surface 721 of the first extending portion 120 is connected the first light incident surface 122. The first reflective surface 721 of the first extending portion 120 is further provided with a plurality of reflective microstructures 722 thereon.

The second reflective surface 821 of the second extending portion 420 is disposed on a surface of the second extending portion 420 being far away from the second plate body 410, and the second reflective surface 821 of the second extending portion 420 is connected the second light incident surface 422. The second reflective surface 821 of the second extending portion 420 is further provided with a plurality of reflective microstructures 822 thereon.

Therefore, when lights L18 of the first light source LS1 can be reflected and guided to a part of the first plate body 110 being far away from the first light source LS1 by the reflective microstructures 822 of the first reflective surface 121 so as to enhance light emitting illumination of the first light guide plate 100. When lights L28 of the second light source LS2 can be reflected and guided to a part of the second plate body 410 being far away from the second light source LS2 by the reflective microstructures 722 of the second reflective surface 421 so as to enhance light emitting illumination of the first light guide plate 400.

Since the first plate body 110 of the first light guide plate 100 has a first thickness H1, and the first extending portion 120 has a second thickness H2, the sum of the first thickness H1 and the second thickness H2 is equal or greater (i.e. not less than) a height L of a light emitting area of the first light source LS1.

Thus, vendors may use a first light source LS1 (e.g. LED elements) with factors of greater thickness and lower cost so that lights outputted from the first light source LS1 can be effectively guided into the first plate body 110, so as to increase higher effectiveness of lights of the first light source LS1. Also, the first plate body 110 can be chosen thinner in thickness. Similarly applied to the second light guide plate 400 and the second light source LS2.

Equally, for example based on the disclosure of the backlight module of the third embodiment (not shown in figures), the first extending portion of the first light guide plate and the third extending portion are respectively presented as a rectangle. The first reflective surface of the first extending portion is a surface of the first extending portion being far away from the first plate body, and connected the first light incident surface. Also, the first reflective surface is prepared with a plurality of microstructures thereon.

The fifth reflective surface of the third extending portion is disposed on a surface of the third extending portion being far away from the first plate body, and connected the third light incident surface. In addition, the fifth reflective surface is prepared with a plurality of microstructures thereon.

The second light guide plate comprises a rectangle plate body stacked on the first inner surface of the first plate body, and disposed between the first extending portion and the third extending portion.

Furthermore, in this embodiment of the invention, the first plate body (or the second plate body) and the first extending portion (or the second extending portion) are not limited to be made integrally together. The first plate body (or the second plate body) and the first extending portion (or the second extending portion) also can be individual elements, respectively, and in other embodiment, the first plate body (or the second plate body) and the first extending portion (or the second extending portion) can be connected with each other by optical clear adhesive (not shown in figures).

Figure 8B:
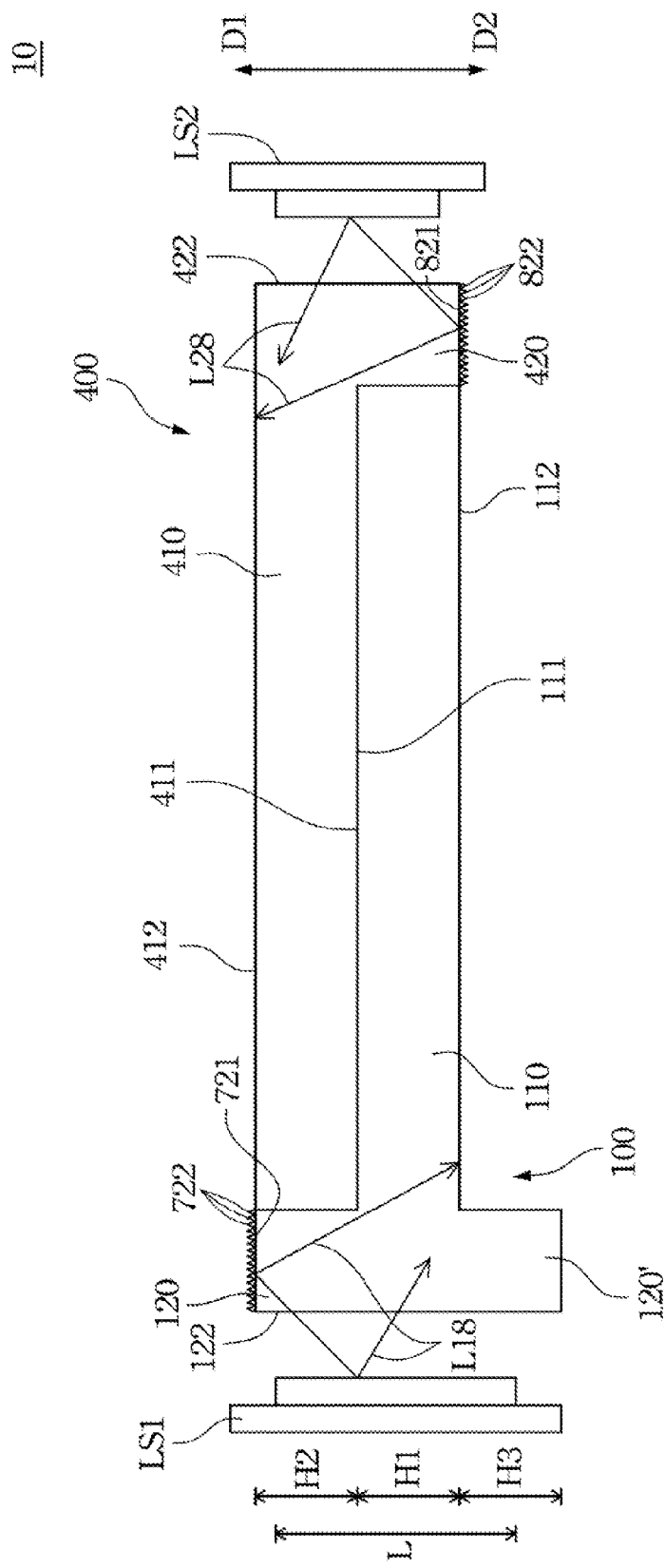
FIG. 8B is a side view illustrating a backlight module according to a fifth embodiment of the present invention.

Refer to FIG. 8B in which FIG. 8B is a side view illustrating a backlight module 10 according to a fifth embodiment of the present invention.

Based on the disclosure of the mentioned fifth embodiment, the first light guide plate 100 further comprises a fourth extending portion 120'. The fourth extending portion 120' is presented as a rectangle, and extending outwardly from the first outer surface 112 in symmetry with the first extending portion 120.

Since the first plate body 110 of the first light guide plate 100 has a first thickness H1, the first extending portion 120 has a second thickness H2, and the fourth extending portion 120' has a third thickness H3, the sum of the first thickness H1, the second thickness H2 and the third thickness H3 is equal or greater (i.e. not less than) a height L of a light emitting area of the first light source LS1.

Thus, vendors may use a first light source LS1 (e.g. LED elements) with factors of greater thickness and lower cost so that lights outputted from the first light source LS1 can be effectively guided into the first plate body 110, so as to increase higher effectiveness of lights of the first light source LS1. Also, the first plate body 110 can be chosen thinner in thickness. Similarly applied to the second light guide plate 400 and the second light source LS2.

Refer to FIG. 9(a)~FIG. 9(f) in which FIG. 9(a)~FIG. 9(f) are side views respectively illustrating one of variations of the reflective surfaces in the backlight module of the present invention.

In each embodiment mentioned above, each reflective surface 700a (i.e. one of the first reflective surface to the sixth reflective surface) can be a single inclined plane, specifically, each reflective surface 700a can be an inclined plane with a single and seamless inclined plane (FIG. 9(a)); or, each reflective surface 700b can be shaped as a plurality of inclined planes directly connected together, e.g. each reflective surface 700b can be a surface with two continual inclined planes (FIG. 9(b)); or each reflective surface 700c can be a combination of a flat plane and an inclined plane, e.g. one flat plane connected with the light incident surface and an inclined plane (FIG. 9(c)); or each reflective surface 700d or 700e can be a convex arc surface or a concave arc surface (FIG. 9(d), FIG. 9(e)); or each reflective surface 700f can be a flat plane only and is parallel with the outer surface of the plate body (FIG. 9(f)).

In each embodiment mentioned above, each plate body (e.g. the first plate body, the second plate body or the trapezoidal plate body) of light guide plate and each extending portion (e.g. the first extending portion, the second extending portion or the third extending portion) are made integrally together so as to create an enlarged and seamless light incident surface. However, the invention is not limited to that. Each plate body and the extending portions of light guide plate can be made individually, and coupled together with an adhesive layer (optical clear adhesive) 900 so as to create an enlarged and seamless light incident surface as well.

The following is to provide a backlight module 10 with the plate body and the extending portions of the light guide plate made individually, based on the disclosure of the backlight module of the first embodiment, however, this practice also can be to the mentioned second embodiment, the mentioned third embodiment and the mentioned fourth embodiment of the backlight module.

Figure 10:
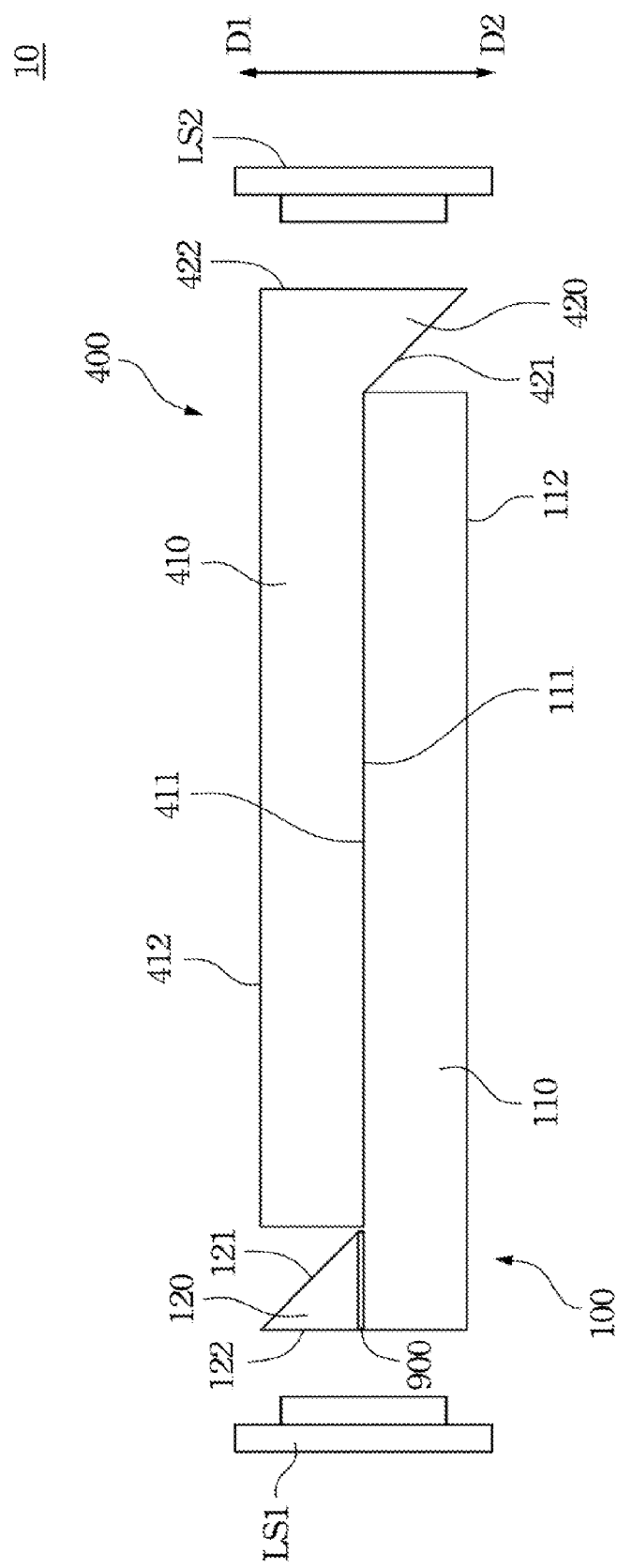
FIG. 10 is a side view illustrating one of the variations of the backlight module according to every mentioned embodiment of the present invention.

Refer to FIG. 10 in which FIG. 10 is a side view illustrating one of the variations of the backlight module according to every mentioned embodiment of the present invention.

The first light guide plate 100 further comprises an adhesive layer 900. The adhesive layer 900 is disposed between the first plate body 110 and the first extending portion 120 for fixing the first extending portion 120 on the first plate body 110.

Likewise, based on the disclosure of the backlight module 12 of the third embodiment in FIG. 5A, the first plate body, the first extending portion and the third extending portion can be made individually, and the first plate body, the first extending portion and the third extending portion can be coupled together with adhesive layers so as to fix the first extending portion and the third extending portion on the first plate body.

In each embodiment of the invention mentioned above, the material of the first light guide plate 100 and the material of the second light guide plate 400 can be the same or different, the material can be chosen from polymethyl methacrylate (PMMA), polycarbonate (PC) or glass, however, the material of the first light guide plate 100 and the material of the second light guide plate 400 is not only limited to them.

Although the present invention has been described with reference to the preferred embodiments thereof, it is apparent to those skilled in the art that a variety of modifications and changes may be made without departing from the scope of the present invention which is intended to be defined by the appended claims.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A backlight module, comprising:
    a first light guide plate and a second light guide plate which are stacked with each other, wherein the first light guide plate comprises:
        a first plate body having a first inner surface and a first outer surface which are opposite with each other, and the first inner surface facing to the second light guide plate; and
        a first extending portion disposed on an edge of the first inner surface, extended near a lateral side of the second light guide plate according to a direction from the first plate body towards the second light guide plate, wherein, both the first plate body and the first extending portion form a first light incident surface thereof, and the first extending portion is further provided with a first reflective surface connected to at least one of the first light incident surface and the first inner surface;
        a third extending portion disposed on an edge of the first inner surface being opposite to the first extending portion, and the third extending portion extended near the other lateral side of the second light guide plate according to the direction from the first plate body towards the second light guide plate, wherein both the first plate body and the third extending portion form a third light incident surface thereof opposite to the first light incident surface, and the third extending portion is further provided with a fifth reflective surface connected to at least one of the third light incident surface and the first inner surface, and the fifth reflective surface, the first inner surface and the first reflective surface form a recess; and
    a first light source disposed at the first light incident surface of the first light guide plate, and projecting light towards the first light incident surface, wherein, the first reflective surface guides the light of the first light source to the first outer surface; and
    a third light source disposed at the third light incident surface of the first light guide plate, and projecting light towards the third light incident surface, wherein, the fifth reflective surface guides the light of the first third light source to the first outer surface;
    the second light guide plate is a trapezoidal plate body received in the recess, the third extending portion, the first extending portion and the trapezoidal plate body are coplanar, and the trapezoidal plate body comprises:
        a third inner surface facing the first inner surface, and disposed between the first extending portion and the third extending portion;

a third outer surface disposed in parallel and opposite to the third inner surface, wherein an area of the third outer surface is greater than an area of the third inner surface;

two sixth reflective surfaces arranged on opposite sides of the trapezoidal plate body, both connecting the third inner surface and the third outer surface, and the sixth reflective surfaces respectively facing the first reflective surface and the fifth reflective surface, and each of the sixth reflective surfaces is complementarily matched in shape with the first reflective surface and the fifth reflective surface; and at least one second light incident surface connected to the third inner surface, the third outer surface and the sixth reflective surfaces; and at least one second light source projecting light towards the at least one second light incident surface, wherein, the sixth reflective surfaces respectively guide light of the at least one second light source emitted through the at least one second light incident surface towards the third outer surface.

2. The backlight module according to claim 1, wherein both the first plate body and the first extending portion form cooperatively a seamless first light incident surface, both the first plate body and the third extending portion form cooperatively a seamless third light incident surface, the first reflective surface is connected to the first light incident surface and the first inner surface, and the fifth reflective surface is connected to the third light incident surface and the first inner surface.

3. The backlight module according to claim 2, further comprising a third reflective plate disposed on the first outer surface of the first plate body, and the second light guide plate further comprises a fluorescent layer arranged on the third outer surface of the trapezoidal plate body.

4. The backlight module according to claim 3, wherein the first light guide plate further comprises another fluorescent layer arranged on the first inner surface of the first plate body.

5. The backlight module according to claim 2, further comprising a fourth reflective plate disposed between the first plate body and the trapezoidal plate body, and the first light guide plate further comprises a fluorescent layer arranged on the first outer surface of the first plate body, and the second light guide plate further comprises another fluorescent layer arranged on the third outer surface of the trapezoidal plate body.

6. The backlight module according to claim 2, wherein at least one of the first reflective surface and the fifth reflective surface is provided with a single inclined plane, a plurality of inclined planes, a combination of a flat plane and an inclined plane, a convex arc surface or a concave arc surface.

7. The backlight module according to claim 1, wherein a height of the first light incident surface is not less than a height of a light emitting area of the first light source.

8. The backlight module according to claim 1, wherein a height of the third light incident surface is not less than a height of a light emitting area of the third light source.

* * * * *